(12) United States Patent
Ishibashi

(10) Patent No.: US 9,382,947 B2
(45) Date of Patent: Jul. 5, 2016

(54) RETAINER FOR RADIAL ROLLER BEARING

(71) Applicant: NSK LTD., Tokyo (JP)

(72) Inventor: Yutaka Ishibashi, Takasaki (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/415,768

(22) PCT Filed: Jul. 12, 2013

(86) PCT No.: PCT/JP2013/069221
§ 371 (c)(1),
(2) Date: Jan. 20, 2015

(87) PCT Pub. No.: WO2014/013955
PCT Pub. Date: Jan. 23, 2014

(65) Prior Publication Data
US 2015/0192173 A1 Jul. 9, 2015

(30) Foreign Application Priority Data

Jul. 17, 2012 (JP) .................................. 2012-158437
Jul. 17, 2012 (JP) .................................. 2012-158802

(51) Int. Cl.
*F16C 33/48* (2006.01)
*F16C 33/46* (2006.01)

(52) U.S. Cl.
CPC .................................. *F16C 33/4694* (2013.01)

(58) Field of Classification Search
CPC .............................. F16C 33/46; F16C 33/4694
USPC .......................... 384/560, 572, 573, 577, 578
See application file for complete search history.

(56) References Cited

U.S. PATENT DOCUMENTS 4,235,487 A * 11/1980 Schard .................. F16C 19/463
384/576
4,472,007 A * 9/1984 De Vito .................... F16C 19/48
384/572

(Continued)

FOREIGN PATENT DOCUMENTS

DE 1815990 A1 * 7/1970 ............ F16C 19/463
DE 4007452 A1 * 9/1991 .......... F16C 33/4623

(Continued)

OTHER PUBLICATIONS

Search Report dated Oct. 22, 2013, issued by the International Searching Authority in counterpart International Application No. PCT/JP2013/069221.

(Continued)

*Primary Examiner* — Adam D Rogers
(74) *Attorney, Agent, or Firm* — Sughrue Mion, PLLC

(57) ABSTRACT

In a circumferential end face 22*a* that is provided so as to face a discontinued portion 12*a*, portions that are aligned axially with a one-end-side rim portion 8*b* and an other-end-side rim portion 9*b* are made as one-end-side bearing surfaces 23*a*, 23*a*. In addition, in the other circumferential end face 24*a*, portions that are aligned axially with the one-end-side rim portion 8*b* and the other-end-side rim portion 9*b* are made as other-end-side bearing surfaces 25*a*, 25*a*. Then, in circumferential clearances 26 that are present between the circumferential end face 22*a* and the other circumferential end face 24*a*, circumferential clearances present between the one-end-side bearing surfaces 23*a*, 23 and the other-end-side bearing surfaces 25*a*, 25*a* are smaller than clearances at the other portions.

2 Claims, 13 Drawing Sheets

(56) References Cited

U.S. PATENT DOCUMENTS

| | | | |
|---|---|---|---|
| 5,528,706 A | 6/1996 | Harimoto et al. | |
| 5,862,592 A | 1/1999 | Harimoto et al. | |
| 6,261,005 B1* | 7/2001 | Winkler | F16C 33/502 384/577 |
| 8,740,470 B2* | 6/2014 | Ishibashi | F16C 33/4635 384/572 |
| 8,944,696 B2* | 2/2015 | Ishibashi | F16C 33/4635 384/576 |
| 9,004,775 B2* | 4/2015 | Ishibashi | F16C 33/4635 384/577 |
| 2013/0272641 A1* | 10/2013 | Hachisuka | F16C 33/4694 384/577 |
| 2014/0301683 A1* | 10/2014 | Higdon | F16C 33/4629 384/447 |

FOREIGN PATENT DOCUMENTS

| | | |
|---|---|---|
| DE | 44 38 657 A1 | 5/1995 |
| DE | 102013214245 A1 * 1/2015 | ........ F16C 33/4635 |
| FR | 2 632 368 A1 | 12/1989 |
| FR | 2918136 A1 * 1/2009 | ........ F16C 33/4635 |
| GB | 2 006 350 A | 5/1979 |
| GB | 2 220 234 A | 1/1990 |
| JP | 55-084316 U | 6/1980 |
| JP | 63-125221 U | 8/1988 |
| JP | 07-042744 A | 2/1995 |
| JP | 2005-233316 A | 9/2005 |
| JP | 2009-014078 A | 1/2009 |
| WO | 2012/036154 A1 | 3/2012 |

OTHER PUBLICATIONS

Written Opinion dated Oct. 22, 2013, issued by the International Searching Authority in counterpart International Application No. PCT/JP2013/069221.

Communication dated May 2, 2016 issued by European Patent Office in counterpart European Patent Application No. 13820509.1.

* cited by examiner

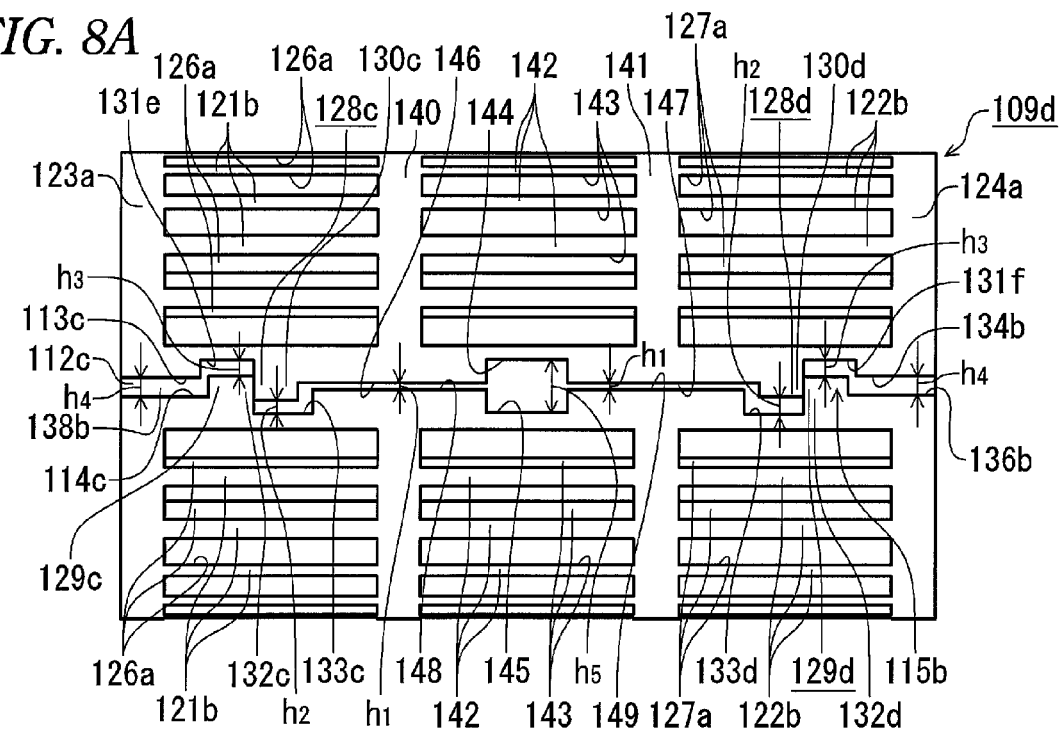
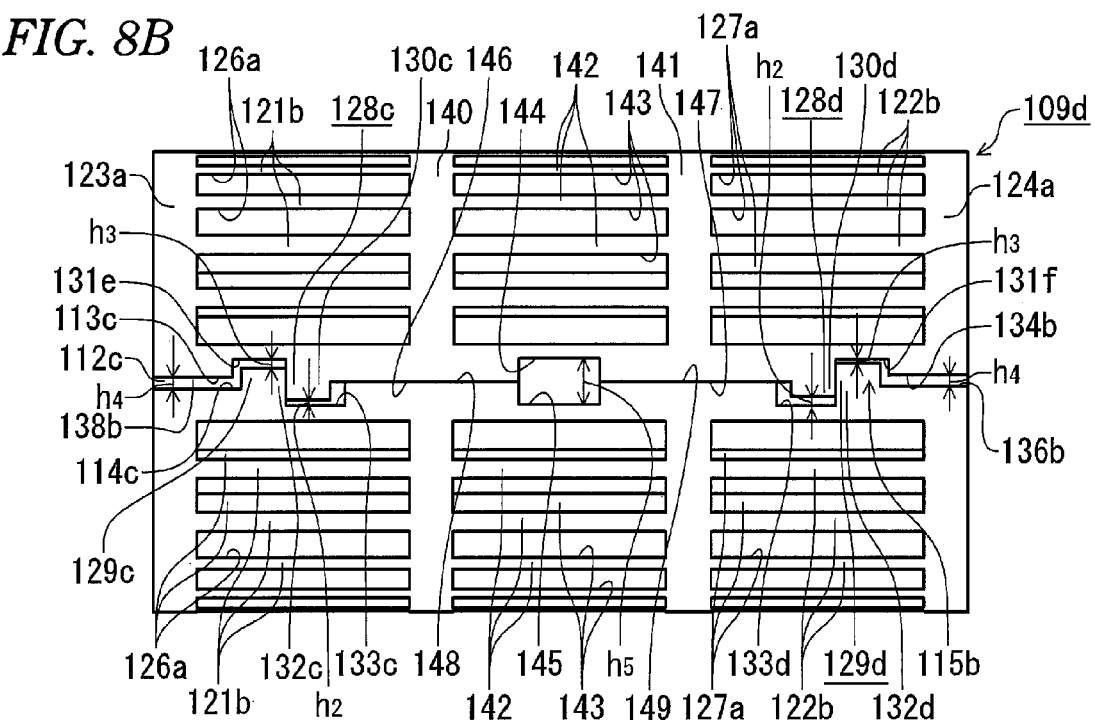

Prior Art

RETAINER FOR RADIAL ROLLER BEARING

TECHNICAL FIELD

The present invention relates to an improved radial roller (including needle) bearing retainer. The invention relates specifically to a radial roller bearing retainer having a discontinued portion at, at least, one location in a circumferential direction whose durability is improved by devising constructions of both circumferential end faces that are provided across the discontinued portion.

BACKGROUND ART

A radial roller bearing 1 as shown in FIG. 9 is incorporated in a portion of a rotational supporting portion of various mechanical apparatuses to which a large radial load is applied. This radial roller bearing 1 is provided so as to roll freely between an outer ring raceway 3 with a cylindrical surface that is provided on an inner circumferential surface of a radially outer member 2 such as a housing that does not rotate even in use (or a gearwheel or a roller that rotates in use) or the like and an inner ring raceway 5 with a cylindrical surface that is provided on an outer circumferential surface of a radially inner member 4 such as a rotational shaft (or a supporting shaft) or the like with a plurality of rollers (needles) 6 retained by a retainer 7 as shown in FIG. 10.

In these constituent parts of the radial roller bearing 1, the retainer 7 is fabricated integrally through injection molding using a synthetic resin and has a cylindrical shape as a whole. This retainer 7 includes a pair of rim portions (a one-end rim portion 8, the other-end rim portion 9) each having a circular ring shape that are disposed coaxially while being spaced away from each other in an axial direction and a plurality of pillar portions 10, 10 that are provided intermittently along the circumferential direction while being stretched between the one-end and other-end rim portions 8, 9. Portions that are surrounded around four sides by the pillar portions 10, 10 that lie adjacent in the circumferential direction and the one-end and other-end rim portions 8, 9 are made into pockets 11, 11 where to retain the rollers 6 individually. Retaining the rollers 6 within these pockets 11, 11 so as to roll freely therein, the retainer 7 is provided between the inner circumferential surface of the radially outer member 2 and the outer circumferential surface of the radially inner member 4 so as to rotate freely relative to the radially outer member 2 and the radially inner member 4. The retainer 7 rotates relative to the radially outer member 2 and the radially inner member 4 as the rollers 6 walk around.

In disposing the retainer 7 around the circumference of the inner ring raceway 5 to build up the radial roller bearing 1, the retainer 7 is placed on the radially inner member 4 from an end portion thereof and is further moved axially to the circumference of the inner ring raceway 5. As this occurs, however, in case an obstacle such as an outwardly oriented flange-like rib portion or the like with an outside diametric dimension that is larger than a bore dimension of the retainer 7 is present on the outer circumferential surface of the radially inner member 4 at a portion lying between the end portion of the radially inner member 4 and the inner ring raceway 5, this obstacle interrupts the passage of the retainer 7, whereby the retainer 7 cannot be moved axially to the circumference of the inner ring raceway 5.

Then, as a retainer that can solve the problem described above, for example, Patent Document 1 describes a retainer (a split retainer) in which a discontinued portion is provided at one location in a circumferential direction. FIGS. 11, 12A and 12B show a retainer 7a that is described in Patent Document 1. In this retainer 7a, a discontinued portion 12 is provided at one location in the circumferential direction. Additionally, an axial relative displacement of end portions (one circumferential end portion 13 and the other circumferential end portion 14) that are provided across the discontinued portion 12 is restricted (substantially prevented) through an engagement (a recess and projection engagement) between a first recess and projection portion 16 and a second recess and projection portion 17 that make up an engagement portion 15.

In the case of the retainer 7a having the configuration described above, the width of the discontinued portion 12 can be expanded in the circumferential direction by elastically deforming the retainer 7a. Because of this, the width of the discontinued portion 12 is expanded more largely than the outside diametric dimension of the radially inner member 4 such as a rotational shaft or the like to which the retainer 7a is assembled so that the shaft is passed through the discontinued portion 12, whereby the retainer 7a can be assembled to the circumference of the shaft. Alternatively, the bore dimension of the retainer 7a is elastically expanded to such an extent that the retainer 7a can ride over the obstacle, so that the retainer 7a is moved axially over the circumference of the shaft to thereby be assembled thereto.

In addition, in the case of the construction of the retainer 7a, as shown in FIG. 12A, in circumferential clearances between one circumferential end face 22 and the other circumferential end face 24 that are provided across the discontinued portion 12, a clearance $H_a$, $H_a$ that aligns with (overlaps) the one-end rim portion 8a or the other-end rim portion 9a in relation to the axial direction is made larger than clearances $H_b$, $H_c$ of other portions ($H_a > H_b$, $H_a > H_c$).

Incidentally, in this retainer 7a, a circumferential relative displacement of the one circumferential end portion 13 (the one circumferential end face 22) and the other circumferential end portion 14 (the other circumferential end face 24) is not restricted. Because of this, in case the retainer 7a is elastically deformed during operation, there may be a situation in which both the end faces 22, 24 are brought into strong abutment with each other.

FIG. 12B shows a state in which the circumferential clearance between both the end portions 22, 24 becomes the smallest in the construction of the retainer 7 described above. In this state, in the engagement portion 15, a front end face of a first engaging projecting portion 18 is in abutment with a deep end face of a second engaging recess portion 21, and front end faces of a pair of second engaging projecting portions 20, 20 are in abutment with deep end faces of a pair of first engaging recess portions 19, 19 (to bear a circumferential load).

These abutment portions are portions that correspond to axial intermediate portions of the pillar portions 10a, 10a that are provided at the circumferential one end and the other circumferential across the discontinued portion 12, and the circumferential rigidity is low at these portions. In case the circumferential load based on the abutment continues to be borne at the portions where the rigidity is low as described above in a repeated fashion, large stress is generated in these portions in a repeated fashion, damaging the portions, whereby the durability of the radial roller bearing retainer 7a is possibly reduced.

On the other hand, in contrast with the single-row retainer 7a that is described above, a double-row (a multi-row) retainer having a shape resulting from combining single-row retainers 7a in the axial direction can also be used to retain rollers that are aligned in a plurality (a multiplicity) of rows so as to roll freely.

FIG. 13A shows the construction of a retainer 109 that is described in Patent Document 1 as an example of a double-row retainer that makes up a radial roller bearing. This retainer 109 has a plurality of one-side pockets 110, 110 that retain, in rollers that are disposed in a plurality of rows, rollers in one row so as to roll freely and a plurality of other-side pockets 111, 111 that retain rollers in the other row so as to roll freely. Additionally, the retainer 109 has a discontinued portion 112 at one location in a circumferential direction. One circumferential end portion 113 and the other circumferential end portion 114 are brought into engagement with each other by an engagement portion 115 so as to prevent substantially an axial relative displacement of both the end portions 113, 114.

In the case of the conventional retainer 109 described above, the width of the discontinued portion 112 can be expanded in the circumferential direction by elastically deforming the retainer 109. This enables the retainer 109 to be assembled around a circumference of a radially inner member 4 (refer to FIG. 9) such as a rotational shaft or the line around which the retainer 109 is assembled by expanding the width of the discontinued portion 112 more largely than an outside diametrical dimension of the radially inner member 4 so that the radially inner member 4 is allowed to pass through a space in the discontinued portion 112. Alternatively, the retainer 109 can also be moved axially over the circumference of the radially inner member 4 to be assembled therearound by elastically expanding a bore diametrical dimension of the retainer 109 to such an extent that the retainer 109 can ride over an obstacle such as a step portion or an outwardly oriented flange-like rib or the like that is provided on the radially inner member 4.

The retainer 109, however, does not restrict a circumferential relative displacement of the one circumferential end portion 113 and the other circumferential end portion 114. Due to this, in case the retainer 109 is elastically deformed during operation, a circumferential space (clearance) between both the end portions 113, 114 changes, and in case the space decreases, there may be a situation in which distal end faces of both the end portions 113, 114 are brought into strong abutment with each other.

FIG. 13B shows a state in the construction of the retainer 109 described above in which the circumferential space between both the end portions 113, 114 becomes the smallest. In this state, both the end portions 113, 114 are brought into abutment with each other at the engagement portion 115 as follows; distal end faces of first engaging projecting portions 117a, 117b are in abutment with deep end faces of second engaging recess portions 120a, 120b, respectively, and distal end faces of second engaging projecting portions 119a, 119b are in abutment with deep end faces of first engaging recess portions 118a, 118b, respectively (a circumferential load is borne by the abutment portions).

These abutment portions correspond to axial intermediate portions of a one-side pillar portion and the other-side pillar portion 121, 122 at one circumferential end and axial intermediate portions of a one-side pillar portion and the other-side pillar portion 121, 122 at the other circumferential end, the pillar portions 121, 122 at the one circumferential end and the pillar portions 121, 122 at the other circumferential end being provided across the discontinued portion 12, and the abutment portions are portions where circumferential rigidity is low. In case the circumferential load based on the abutment continues to be borne repeatedly at the portions having the low rigidity, large stress is generated in those portions repeatedly, leading to a possibility that the portions bearing the load are damaged, whereby the durability of the radial roller bearing retainer 109 is reduced.

RELATED ART REFERENCE

Patent Document

Patent Document 1: JP-W-2012-036154

SUMMARY OF THE INVENTION

Problems to be Solved by the Invention

In view of the situations described above, the invention has been made to realize a construction that can improve the durability of a radial roller bearing retainer having a discontinued portion at, at least, one location in a circumferential direction by bearing a load based on an abutment that will occur between one circumferential end face and the other circumferential end face that lie to face each other across the discontinued portion in case the retainer is elastically deformed during operation at a portion where a circumferential rigidity is high.

Means for Solving the Problems

The aforesaid object of the invention is attained by the following configurations.
(1) A radial roller bearing retainer having a discontinued portion at, at least, one location in a circumferential direction,
comprising a plurality of rim portions, a plurality of pillar portions, a plurality of pockets, and an engagement portion,
in these constituent parts, the rim portions each having a segmental ring shape and being provided coaxially so as to be spaced apart from each other in an axial direction,
the pillar portions being provided intermittently along the circumferential direction so as to be stretched between the rim portions,
the pockets being provided in portions that are surrounded along four sides by the rim portions that lie adjacent in the axial direction and the pillar portions that lie adjacent in the circumferential direction,
the engagement portion being brought into engagement so as to prevent an axial relative displacement of end portions that are provided to face each other across the discontinued portion, the radial roller bearing retainer being characterized in that
in one circumferential end face that is provided so as to face the other circumferential end face across the discontinued portion, a portion that aligns axially with the rim portion that is provided at one axial end and a portion that aligns axially with the other axial end are made as a one-end-side bearing surface, while
in the other circumferential end face, a portion that aligns axially with the rim portion that is provided at the one axial end and a portion that aligns with the rim portion that is provided at the other axial end are made as an other-end-side bearing surface, and in that
in circumferential clearances that are present between the one circumferential end face and the other circumferential end face, clearances that are present between the one-end-side bearing surface and the other-end-side bearing surface are smaller than clearances at the other portions.
(2) The radial roller bearing retainer described under (1), characterized in that a circumferential clearance between a portion of the one circumferential end face that aligns axially with an axial central portion of each of the pillar portions and a portion of the other circumferential end face that aligns axially with the axial central portion of each of the pillar portions is larger than the circumferential clearances between the one-end-side bearing surface and the other-end-side bearing surface.

(3) The radial roller bearing retainer described under (1) or (2), characterized in that the rim portions comprise a one-end-side rim portion, the other-end-side rim portion, and at least one intermediate-side rim portion that is disposed at a portion lying between the one-end-side rim portion and the other-end-side rim portion in relation to an axial direction, the one-end-side rim portion, the other-end-side rim portion and the intermediate-side rim portion each having a segmental ring shape and being provided coaxially so as to be spaced apart from each other in the axial direction, and in that in the one circumferential end face, portions that align axially with the rim portions are made as one-end-side bearing surface, while in the other circumferential end face, portions that align axially with the rim portions are made as an other-end-side bearing surface.

(4) A radial roller bearing retainer having a discontinued portion at, at least, one location in a circumferential direction, comprising three or more rim portions, a plurality of pillar portions, a plurality of pockets, and an engagement portion, these rim portions comprising one-end-side rim portion, the other-end-side rim portion, and at least one intermediate-side rim portion that is disposed at a portion lying between the one-end-side rim portion and the other-end-side rim portion in relation to an axial direction, the one-end-side rim portion, the other-end-side rim portion and the intermediate-side rim portion each having a segmental ring shape and being provided coaxially so as to be spaced apart from each other in the axial direction, the pillar portions being provided intermittently along the circumferential direction so as to be stretched between the rim portions that lie adjacent in the axial direction, the pockets being provided by portions that are surrounded along four sides by the rim portions that lie adjacent in the axial direction and the pillar portions that lie adjacent in the circumferential direction, the engagement portion being brought into engagement so as to prevent an axial relative displacement of one circumferential end portion and the other circumferential end portion that are provided to face each other across the discontinued portion, the radial roller bearing retainer being characterized in that in one circumferential end face that is provided so as to face the other circumferential end face across the discontinued portion, a portion that aligns axially with the intermediate-side rim portion is made as one-end-side bearing surface, while in the other circumferential end face, a portion that aligns axially with the intermediate-side rim portion is made as an other-end-side bearing surface, and in that in circumferential clearances that are present between the one circumferential end face and the other circumferential end face, a clearance that is present between the one-end-side bearing surface and the other-end-side bearing surface is smaller than clearances at the other portions.

(5) The radial roller bearing retainer described under (4), characterized in that in the one circumferential end face, portions that align axially with axial central portions of the pillar portions are recessed further circumferentially than the one-end-side bearing surface, in of the other circumferential end face, portions that align axially with the axial central portions of the pillar portions are recessed further circumferentially than the other-end-side bearing surface.

Advantage of the Invention

In the case of the radial roller bearing retainer of the invention that has the configuration described under (1) above, of the one circumferential end face that is provided so as to face the other circumferential end face across the discontinued portion, the portions that aligns axially with the rim portions that are provided at the one axial end and the other axial end are made as the one-end-side bearing surface, while of the other circumferential end face, the portions that aligns axially with the rim portions that are provided at the one axial end and the other axial end are made as the other-end-side bearing surface. Then, in the circumferential clearances that are present between both the end faces, the clearances that are present between the one-end-side bearing surface and the other-end-side bearing surface are smaller than the clearances at the other portions.

Consequently, with the one-end-side and the other-end-side bearing surfaces being in abutment with each other (with the clearances eliminated), the clearances remain at the other portions (the circumferential end faces are not in abutment at the other portions). Because of this, even though both the circumferential end faces are brought into strong abutment with each other based on the elastic deformation of the radial roller bearing retainer during operation, the load based on this abutment can be borne at the portions where the circumferential rigidity is high due to the presence of the rim portions that are provided at the one axial end and the other axial end. As a result, no excessive stress is generated in part of both the circumferential end faces of the radial roller bearing retainer, whereby the durability of the radial roller bearing retainer can be improved.

In the case of the invention described (2) above, the circumferential clearance between the portion of the one circumferential end face that aligns axially with the axial central portion of each of the pillar portions and the portion of the other circumferential end face that aligns axially with the axial central portion of each of the pillar portions is larger than the circumferential clearances between the one-end-side bearing surface and the other-end-side bearing surface. Consequently, with the one-end-side and the other-end-side bearing surfaces being in abutment with each other, the circumferential clearance is present between the portions of the circumferential end faces that align axially with the axial intermediate portions of the pillar portions (the portions of the circumferential end faces are not in abutment with each other). This prevents, in an ensured fashion, the load based on the abutment from being applied to the portions where the circumferential rigidity is low like the pillar portions that are provided at both the circumferential ends (the ends that faces each other across the discontinued portion), whereby the durability of the radial roller bearing retainer can be improved.

In the case of the invention described under (4) above, of the one circumferential end face that is provided so as to face the other circumferential end face across the discontinued portion, the portion that aligns axially with the intermediate-side rim portion is made as the one-end-side bearing surface, while of the other circumferential end face, the portion that aligns axially with the intermediate-side rim portion is made as the other-end-side bearing surface. Then, in the circumferential clearances that are present between the one circumferential end face and the other circumferential end face, the clearance that is present between the one-end-side bearing surface and the other-end-side bearing surface is smaller than the clearances at the other portions. Consequently, with the one-end-side bearing surface and the other-end-side bearing surface being in abutment with each other (with the clearance eliminated), the clearances remain at the other portions (the circumferential end faces are not in abutment at the other portions). Because of this, even though both the circumferential end faces are brought into strong abutment with each other based on the elastic deformation of the radial roller bearing retainer during operation, the load based on this abutment can be borne at the portions where the circumferential rigidity is high due to the presence of the intermediate rim portions. As a result, no excessive stress is generated in part of both the circumferential end faces of the radial roller bearing retainer, whereby the durability of the radial roller bearing retainer can be improved.

In addition, in the case of the invention described under (5) above, of the one circumferential end face, the portions that align axially with the axial central portions of the pillar portions are recessed further circumferentially than the one-end-side bearing surface, or of the other circumferential end face, the portions that align axially with the axial central portions of the pillar portions are recessed further circumferentially than the other-end-side bearing surface. Consequently, with the one-end-side bearing surface and the other-end-side bearing surface being in abutment with each other, the circumferential clearances are present between the portions of both the circumferential end faces that align axially with the axial central portions of the pillar portions (the circumferential end faces are not in abutment at the other portions). This prevents, in an ensured fashion, the load based on the abutment from being applied to the portions where the circumferential rigidity is low like the pillar portions, whereby the durability of the radial roller bearing retainer can be improved.

BRIEF DESCRIPTION OF THE DRAWINGS

FIGS. 8A and 8B show front projections of a discontinued portion of a retainer according to a sixth embodiment of the invention as seen from a radially outer side that show a state in which a space in the discontinued portion is expanded at FIG. 8A and a state in which the space is narrowed at FIG. 8B.

MODES FOR CARRYING OUT THE INVENTION

First Embodiment

Figure 1:
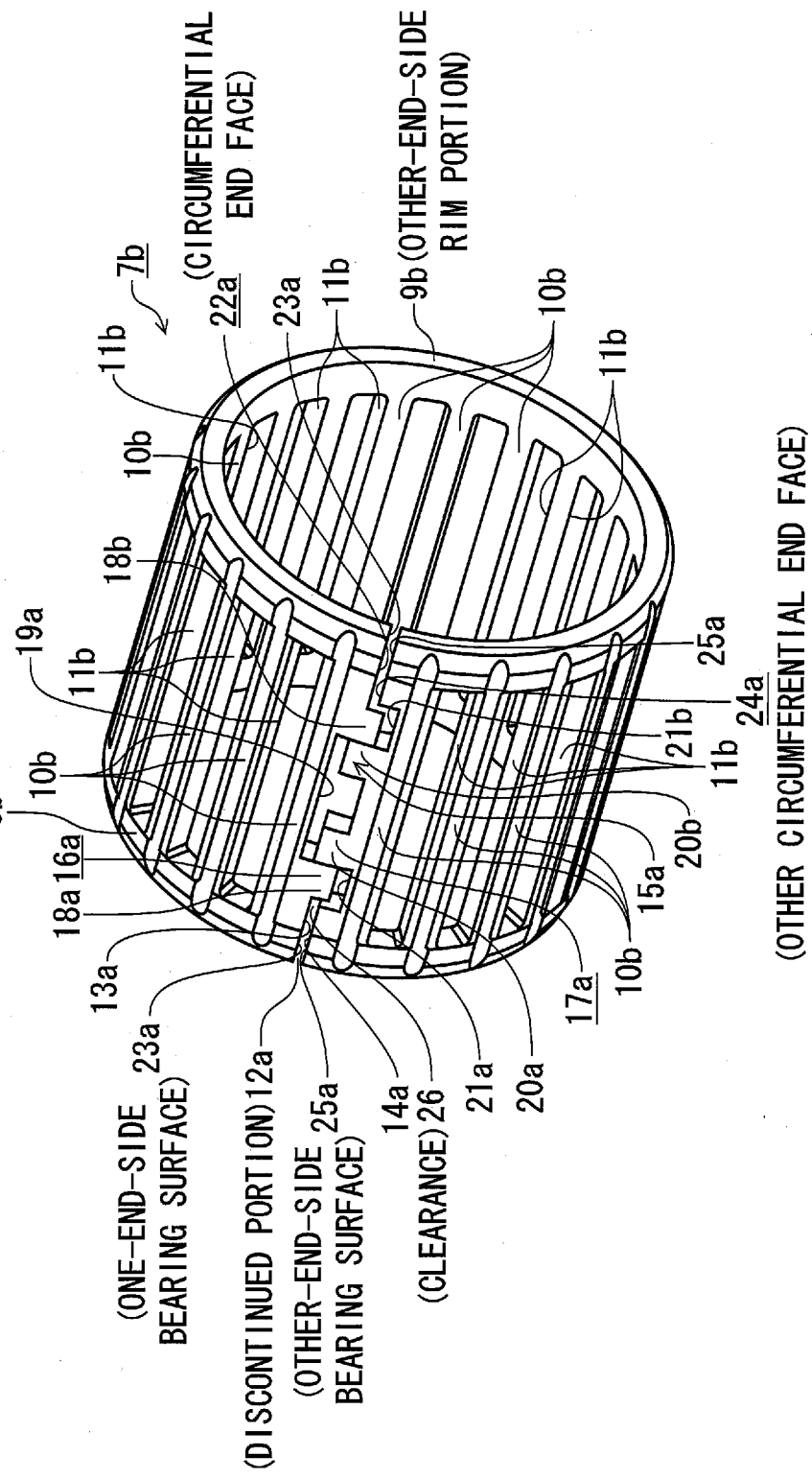
FIG. 1 is a perspective view showing a retainer according to a first embodiment of the invention.
Figure 2A:
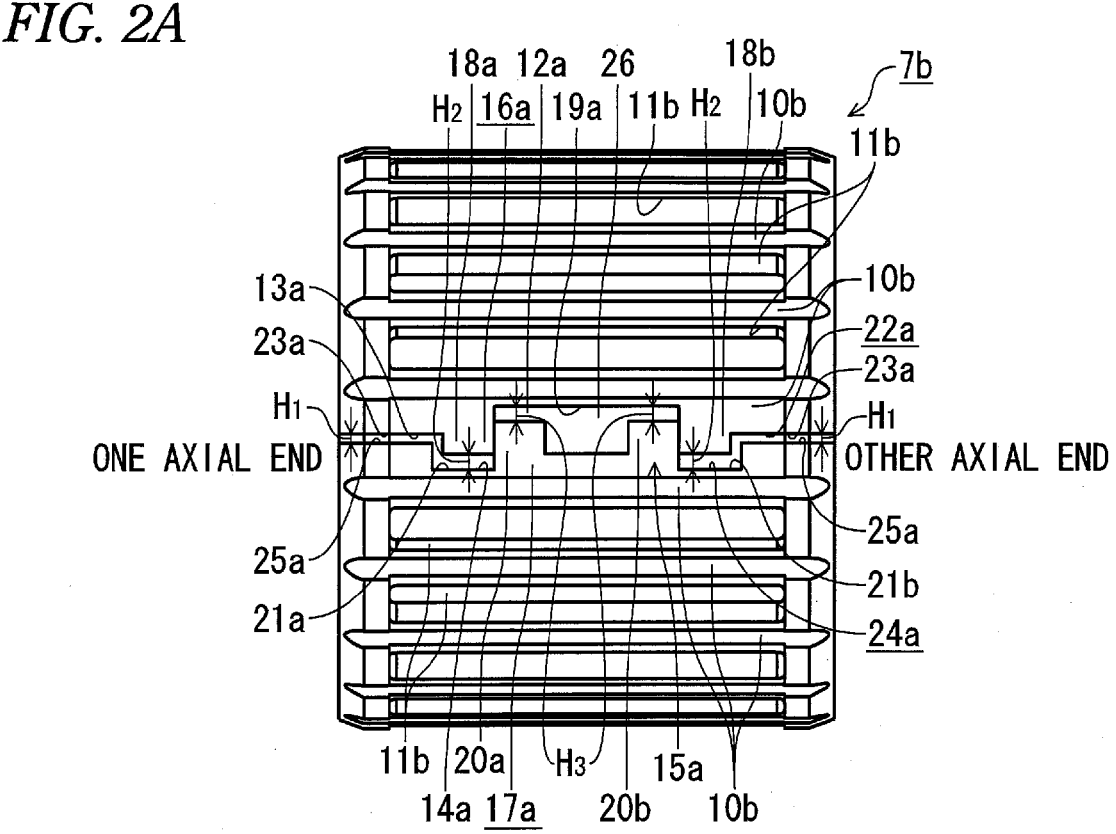
FIGS. 2A and 2B show front projections of the retainer as seen from a radially outer side that show a state in which a space in a discontinued portion in the retainer is expanded at FIG. 2A and a state in which the space is narrowed at FIG. 2B.
Figure 2B:
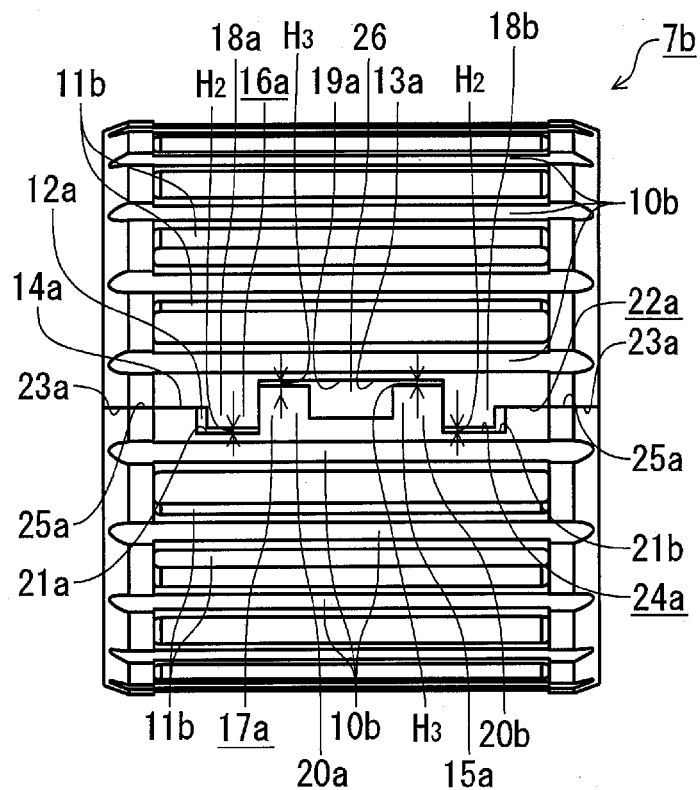
Figure 9:
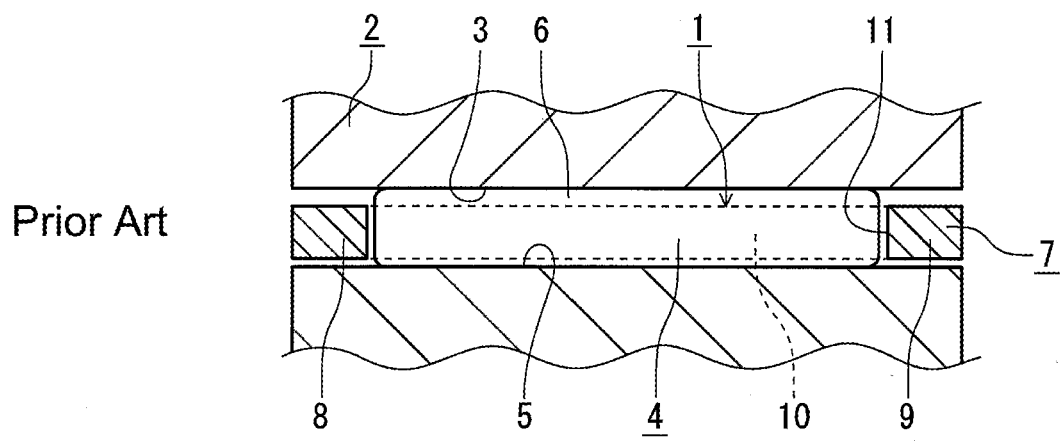
FIG. 9 is a sectional view of a rotational supporting portion in which a radial roller bearing with a retainer is incorporated.
Figure 10:
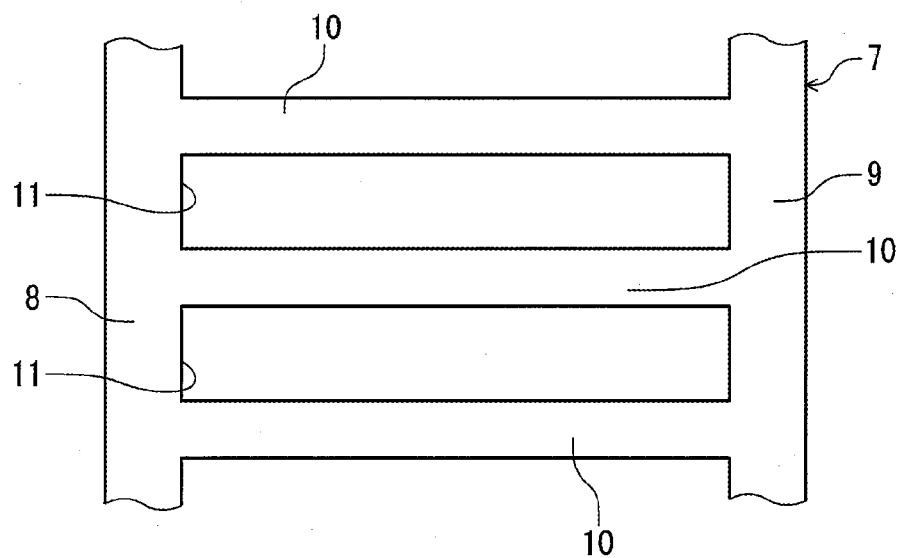
FIG. 10 is a view showing a circumferential portion of a retainer as seen from a radially outer side according to a first embodiment of a conventional construction.
Figure 11:
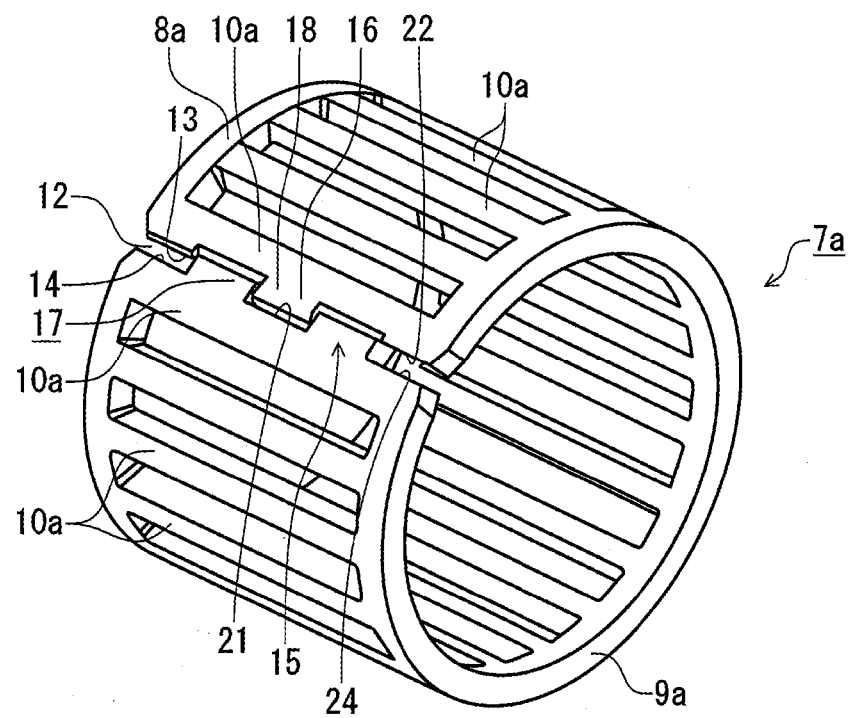
FIG. 11 is a perspective view of a radial roller bearing retainer according to a second embodiment of the conventional construction.
Figure 12A:
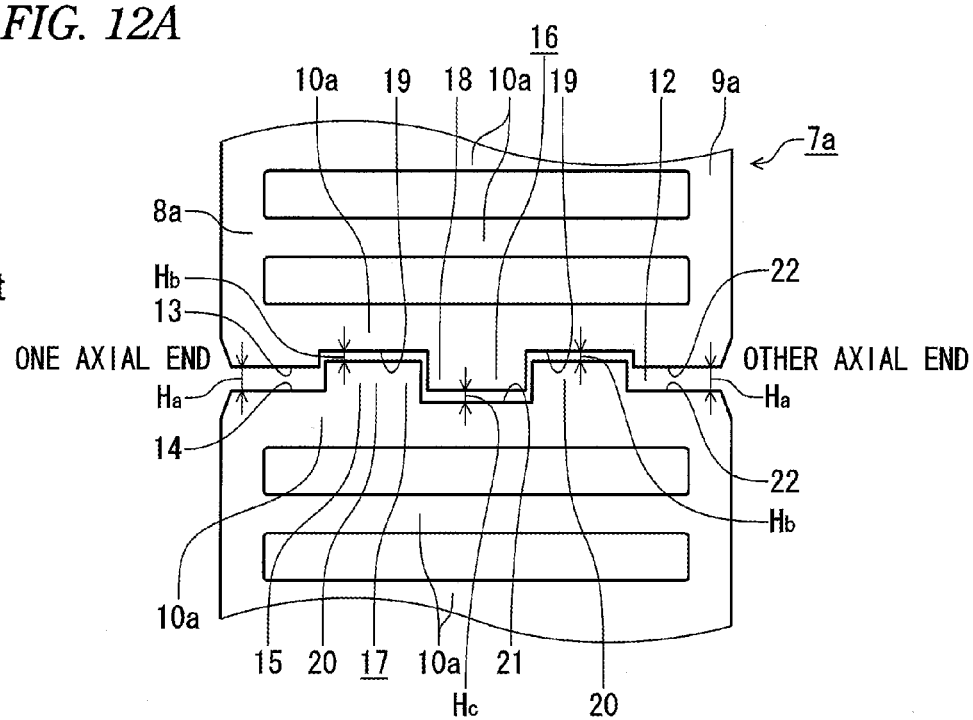
FIGS. 12A and 12B are development elevations of a circumferential portion of a discontinued portion that shows a state in which a space in the discontinued portion is expanded at FIG. 12A and a state in which the space is narrowed at FIG. 12B.
Figure 12B:
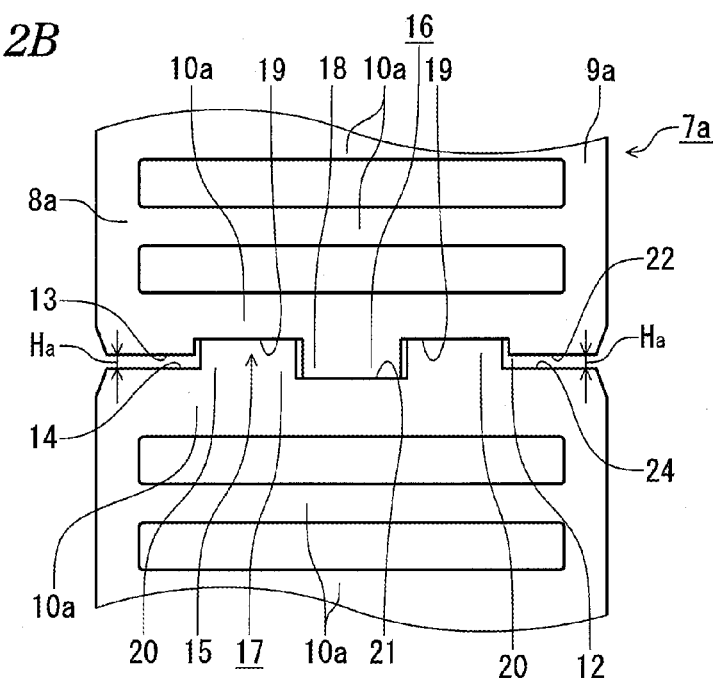

FIGS. 1, 2A and 2B show a first embodiment of the invention. A radial roller bearing retainer 7b of this embodiment is intended to retain rollers 6 that are disposed in a single row (refer to FIG. 9) by pockets 11b so as to roll freely as in the conventional radial roller bearing retainer 7a described above (refer to FIGS. 11, 12A and 12B), and a discontinued portion 12a is provided at one circumferential location.

A circumferential end portion 13a and the other circumferential end portion 14a that are provided so as to face each other across the discontinued portion 12a are brought into engagement with each other by an engagement portion 15a in such a state that both the end portions 13a, 14a are restricted (substantially prevented) from being displaced relative to each other in an axial direction. The engagement portion 15a is made up of a first recess and projection portion 16a that is formed on the circumferential end portion 13a and a second recess and projection portion 17a that is formed on the other circumferential end portion 14a.

The first recess and projection portion 16a includes a pair of first engaging projecting portion 18a, 18b that are formed in such a way as to be spaced apart from each other in the axial direction and a first engaging recess portion 19a. In these constituent portions, the first engaging projecting portion 18a (a left-hand side in FIGS. 1, 2A and 2B) is formed at a portion of the circumferential end portion 13a that lies nearer to an axial end of an axial intermediate portion in such a way as to extend in a circumferential direction (towards the other circumferential end portion 14a). In addition, the other first engaging projecting portion 18b is formed at a portion of the circumferential end portion 13a that lies nearer to the other axial end of the axial intermediate portion in such a way as to extend in the circumferential direction (towards the other circumferential end portion 14a). Further, the first engaging recess portion 19a is formed in a portion lying between both the first engaging projecting portions 18a, 18b in an axial direction in such a way that the portion is recessed in the circumferential direction (in an opposite direction to the other circumferential end portion 14a).

Additionally, the second recess and projection portion 17a is made up of a pair of second engaging projecting portions 20a, 20b that are provided so as to be spaced apart from each other in the axial direction and a pair of second engaging recess portions 21a, 21b that are provided so as to be spaced apart from each other in the axial direction. In these constituent portions, the second engaging projecting portion 20a is formed in a position that aligns with the axial end portion of the first engaging recess portion 19a in such a way as to extend in the circumferential direction (towards the circumferential end portion 13a). Additionally, the other second engaging projecting portion 20b is formed in a position that aligns with the other axial end portion of the first engaging recess portion 19a in such a way as to extend in the circumferential direction (towards the circumferential end portion 13a).

Additionally, the second engaging recess portion 21a is formed at an axial side of the second engaging projecting portion 20a as a recess that recedes in the circumferential direction (in an opposite direction to the circumferential end portion 13a). In addition, the other second engaging recess portion 21a is formed at the other axial side of the other second engaging projecting portion 20b as a recess that recedes in the circumferential direction (in an opposite direction to the circumferential end portion 13a).

In the case of this embodiment, the first recess and engaging projecting portion 16a and the second recess and projection portion 17a are brought into recess and projection engagement with each other in such a state that the second engaging projecting portion 20a is disposed at the other axial side of the first engaging projecting portion 18a and the other second engaging projecting portion 20b is disposed at the axial side of the other first engaging projecting portion 18b. With the first recess and engaging projecting portion 16a and the second recess and projection portion 17a being in recess and projection engagement in the way described above, the first engaging projecting portion 18a is in axial engagement with the second engaging projecting portion 20a and the other first engaging projecting portion 18b is in axial engagement with the other second engaging and projecting portion 20b, whereby the axial relative displacement of both the circumferential end portions 13a, 14a is restricted (substantially prevented).

In particular, in the case of the radial roller bearing retainer 7a of this embodiment, in a circumferential end face 22a that is provided to face the discontinued portion 12a, surfaces that include portions that align axially with a one-end-side rim portion 8b and an other-end-side rim portion 9b and that are present on the same planes as those of the portions are made as one-end-side bearing surfaces 23a, 23a.

In addition, in the other circumferential end face 24a, surfaces that include portions that align axially with the one-end side rim portion 8b and the other-end-side rim portion 9b and that are present on the same planes as those of the portions are made as other-end-side bearing surfaces 25a, 25a.

In circumferential clearances 26 that are present between both the circumferential end faces 22a, 24a, clearances present between the one-end-side bearing surfaces 23a, 23a and the other-end-side bearing surfaces 25a, 25a are set to be smaller than clearances at the other portions.

Namely, as shown in FIG. 2A, clearances $H_1$, $H_1$ present between the one-end-side bearing surfaces 23a, 23a and the other-end-side bearing surfaces 25a, 25a are set to be smaller than clearances $H_2$, $H_2$ present between distal end faces of both the first engaging projecting portions 18a, 18b and deep end faces of both the second engaging recess portion 21a, 21b and clearances $H_3$, $H_3$ present between a deep end face of a first engaging recess portion 19a and distal end faces of both the second engaging projecting portions 20a, 20b ($H_1 < H_2$, $H_1 < H_3$).

In the radial roller bearing retainer 7a of this embodiment that has the configuration described above, as shown in FIG. 2B, with both the circumferential end faces 22a, 24a approaching each other to a nearest extent, only the clearances $H_1$ become 0 ($H_1=0$, the clearances are eliminated), while the other clearances $H_2$, $H_3$ remain larger than 0 ($H_2>0$, $H_3>0$, the clearances remain).

As described above, according to the radial roller bearing retainer 7a of this embodiment, even in such a state that the one-end-side bearing surfaces 23a, 23a are in abutment with the other-end-side bearing surfaces 25a, 25a (the clearances are eliminated), the clearances remain at the other portions (the circumferential end faces 22a, 24a are not in abutment at the other portions). Because of this, even though the circumferential end faces 22a, 24a are brought into strong abutment with each other as a result of the elastic deformation of the radial roller bearing retainer 7a during operation, the load resulting from this abutment can be borne at the portions with high circumferential rigidity where the one-end side rim portion 8b and the other-end-side rim portion 9b are provided. As a result, it is possible to prevent the generation of excessive stress in part of the radial roller bearing retainer 7a, in particular, in the axial intermediate portions of the pillar portions 10b, 10b that are provided at the circumferential ends of the retainer, thereby making it possible to improve the durability of the radial roller bearing retainer 7a.

Second Embodiment

Figure 3A:
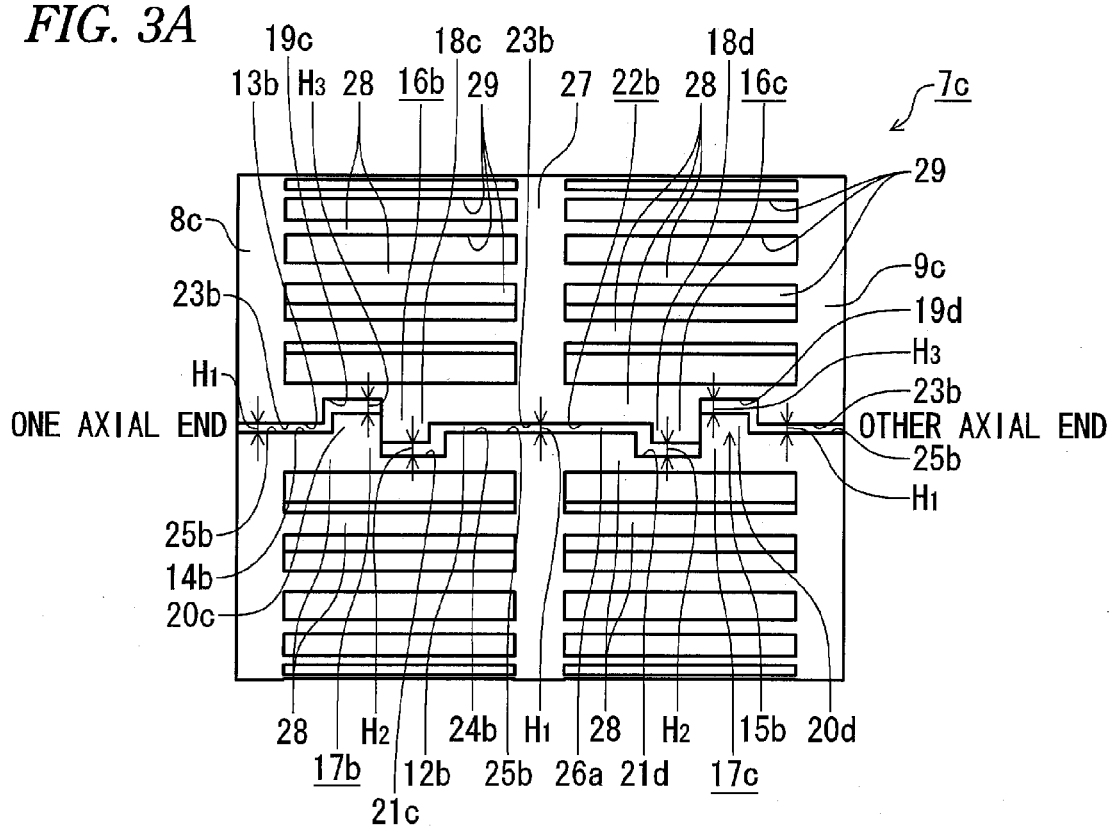
FIGS. 3A and 3B show front projections of a retainer according to a second embodiment of the invention as seen from a radially outer side that show a state in which a space in the discontinued portion of the retainer is expanded at FIG. 3A and a state in which the space is narrowed at FIG. 3B.
Figure 3B:
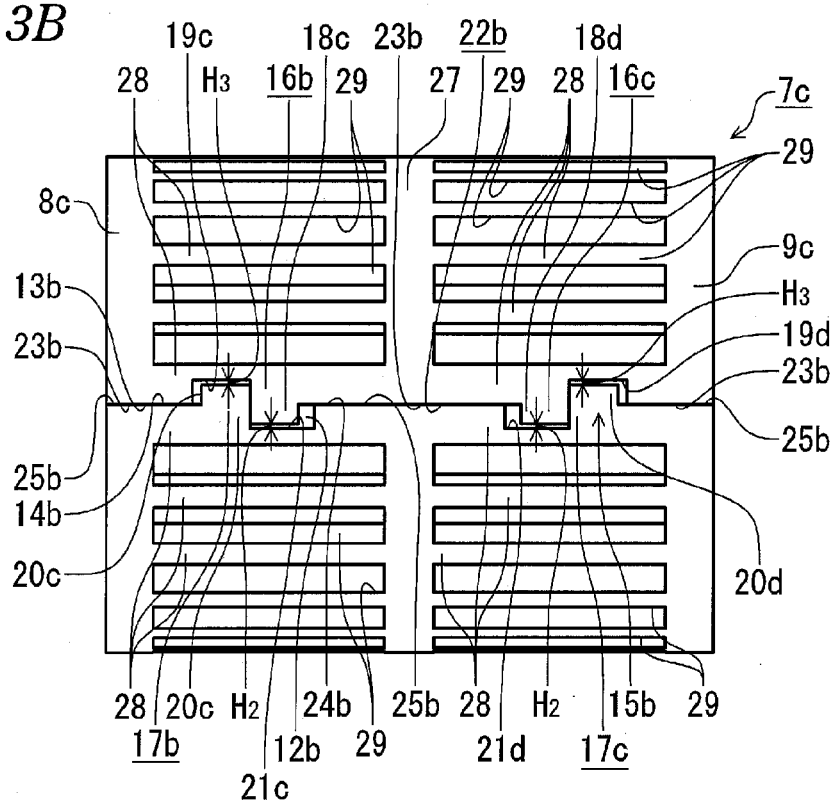

FIGS. 3A and 3B show a second embodiment of the invention. A radial roller bearing retainer 7c of this embodiment is intended to retain rollers that are arranged into a plurality of rows so as to roll therein freely. This retainer 7c has a one-end-side rim portion 8c and an other-end-side rim portion 9c, and a center-side rim portion 27 that corresponds to an intermediate-side rim portion of claims, these rim portions each having a segmental ring shape and being provided coaxially so as to be spaced apart from each other in an axial direction. This center-side rim portion 27 is provided at an axial center position between the one-end-side rim portion 8c and the other-end-side rim portion 9c.

In addition, a plurality of pillar portions 28, 28 are provided intermittently along a circumferential direction in such a way as to be stretched between the one-end-side rim portion 8c, the center-side rim portion 27 and the other-end-side rim portion 9c. Then, portions that are surrounded around four sides by the pillar portions 28, 28 adjoined in a circumferential direction, the one-end-side rim portion 8c, the center-side rim portion 27 and the other-end-side rim portion 9c are made as pockets 29, 29 that are intended to retain the rollers so as to roll freely therein.

In the case of this embodiment, the pockets 29, 29 that make up one row (a left row in FIGS. 3A and 3B) and the pockets 29, 29 that make up the other row (a right row in FIGS. 3A and 3B) coincide with each other in relation to their circumferential positions.

Similar to the retainer of the first embodiment described above, the retainer 7c of this embodiment has a discontinued portion 12b that is provided at one location in the circumferential direction. Additionally, a circumferential end portion 13b and the other circumferential end portion 14b that are provided to face each other across the discontinued portion 12b are restricted (substantially prevented) from being displaced relative to each other in the axial direction by an engagement portion 15b.

The engagement portion 15b includes first recess and projection portions 16b, 16c that are provided on the circumferential end portion 13b in positions that are spaced apart from each other in the axial direction and second recess and projection portions 17b, 17c that are formed on the other circumferential end portion 14b in positions that are spaced apart from each other in the axial direction.

Of these first recess and projection portions 16b, 16c, the first recess and projection portion 16b (the left recess and projection portion in FIGS. 3A and 3B) is made up of a first engaging projecting portion 18c and a first engaging recess portion 19c. This first engaging projecting portion 18c is formed in a position that aligns with an axial central portion of the pockets 29, 29 that make up the one row in such a way as to extend in the circumferential direction (towards the other circumferential end portion 14b). In addition, the first engaging recess portion 19c is formed at an axial side of the first engaging projecting portion 18c in such a way as to recede in the circumferential direction (in an opposite direction to the other circumferential end portion 14b).

In addition, the other first recess and projection portion 16c (the right recess and projection portion in FIGS. 3A and 3B) is made up of a first engaging and projecting portion 18d and a first engaging recess portion 19d and is formed mirror symmetrical with the first recess and projection portion 16b (the first engaging projection portion 18c, the first engaging recess portion 19c) with respect to the central-side rim portion 27.

Additionally, of the second recess and projection portions 17b, 17c, the second recess and projection portion 17b (the left second recess and projection portion in FIGS. 3A and 3B) is made up of a second engaging projecting portion 20c and a second engaging recess portion 21c. The second engaging projecting portion 20c is formed in a position that aligns axially with the first engaging recess portion 19c in such a way as to recede in the circumferential direction (in an opposite direction to the circumferential one end portion 13b). The second engaging recess portion 21c is formed in a position that aligns axially with the first engaging projecting portion 18c in such a way as to recede in the circumferential direction (in the opposite direction to the other circumferential end portion 14b).

The other second recess and projection portion 17c (the right recess and projection portion in FIGS. 3A and 3B) is made up of a second engaging projecting portion 20d and a second engaging recess portion 21d and is formed mirror symmetrical with the second recess and projection portion 17b (the second engaging projecting portion 20c, the second engaging recess portion 21c) with respect to the central-side rim portion 27.

In the case of this embodiment, the first recess and projection portions 16b, 16c and the second recess and projection portions 17b, 17c are brought into recess and projection engagement with each other in such a state that the second engaging projecting portion 20c is disposed at the axial side of the first engaging projecting portion 18c and the other second engaging projecting portion 20d is disposed at the other axial side of the other first engaging projecting portion 18d. With the first recess and projection portions 16b, 16c and the second recess and projection portions 17b, 17c brought into recess and projection engagement with each other in the way described above, the first engaging projecting portion 18c is brought into axial engagement with the second engaging projecting portion 20c, and the other first engaging projecting portion 18d is brought into axial engagement with the other second engaging projecting portion 20d, whereby an axial relative displacement of the circumferential end portion 13b and the other circumferential end portion 14b is restricted (substantially prevented).

In the case of this embodiment, in a circumferential end face 22b that is provided so as to face the discontinued portion 12b, surfaces that include portions that align axially with the one-end-side rim portion 8c, the central-side rim portion 27, and the other-end-side rim portion 9c and that are present on the same plane as those of the portions are made as one-end-side bearing surfaces 23b, 23b, 23b.

In the other circumferential end face 24b, surfaces that include portions that align axially with the one-end-side rim portion 8c, the central-side rim portion 27, and the other-end-side rim portion 9c and that are present on the same plane as those of the portions are made as the other-end-side bearing surfaces 25b, 25b, 25b.

In circumferential clearances 26a that are present between both the circumferential end faces 22b, 24b, clearances present between the one-end-side bearing surfaces 23b, 23b, 23b and the other-end-side bearing surfaces 25b, 25b, 25b are set to be smaller than clearances at the other portions.

Namely, as shown in FIG. 3A, clearances $H_1$, $H_1$, $H_1$ present between the one-end-side bearing surfaces 23b, 23b, 23b and the other-end-side bearing surfaces 25b, 25b, 225b are set to be smaller than clearances $H_2$, $H_2$ present between distal end faces of both the first engaging projecting portions 18c, 18d and deep end faces of both the second engaging recess portion 21c, 21d and clearances $H_3$, $H_3$ present between a deep end face of a first engaging recess portion 19c, 19d distal end faces of both the second engaging projecting portions 20c, 20d ($H_1 < H_2$, $H_1 < H_3$).

In the radial roller bearing retainer 7c of this embodiment that has the configuration described above, as shown in FIG. 3B, with both the circumferential end faces 22b, 24b approaching each other to a nearest extent, only the clearances $H_1$ become 0 ($H_1 = 0$, the clearances are eliminated), while the other clearances $H_2$, $H_3$ remain larger than 0 ($H_2 > 0$, $H_3 > 0$, the clearances remain).

As described above, according to the radial roller bearing retainer 7a of this embodiment, even in such a state that the one-end-side bearing surfaces 23b, 23b are in abutment with the other-end-side bearing surfaces 25b, 25b (the clearances are eliminated), the clearances remain at the other portions (the circumferential end faces 22b, 24b are not in abutment at the other portions). Because of this, even though the circumferential end faces 22b, 24b are brought into strong abutment with each other as a result of the elastic deformation of the radial roller bearing retainer 7c during operation, the load resulting from this abutment can be borne at the portions with high circumferential rigidity where the one-end-side rim portion 8c, the central-side rim portion 27, and the other-end-side rim portion 9c are provided. The other configuration and function and advantage are almost the same as those of the first embodiment that has been described before.

Third Embodiment

Figure 4:
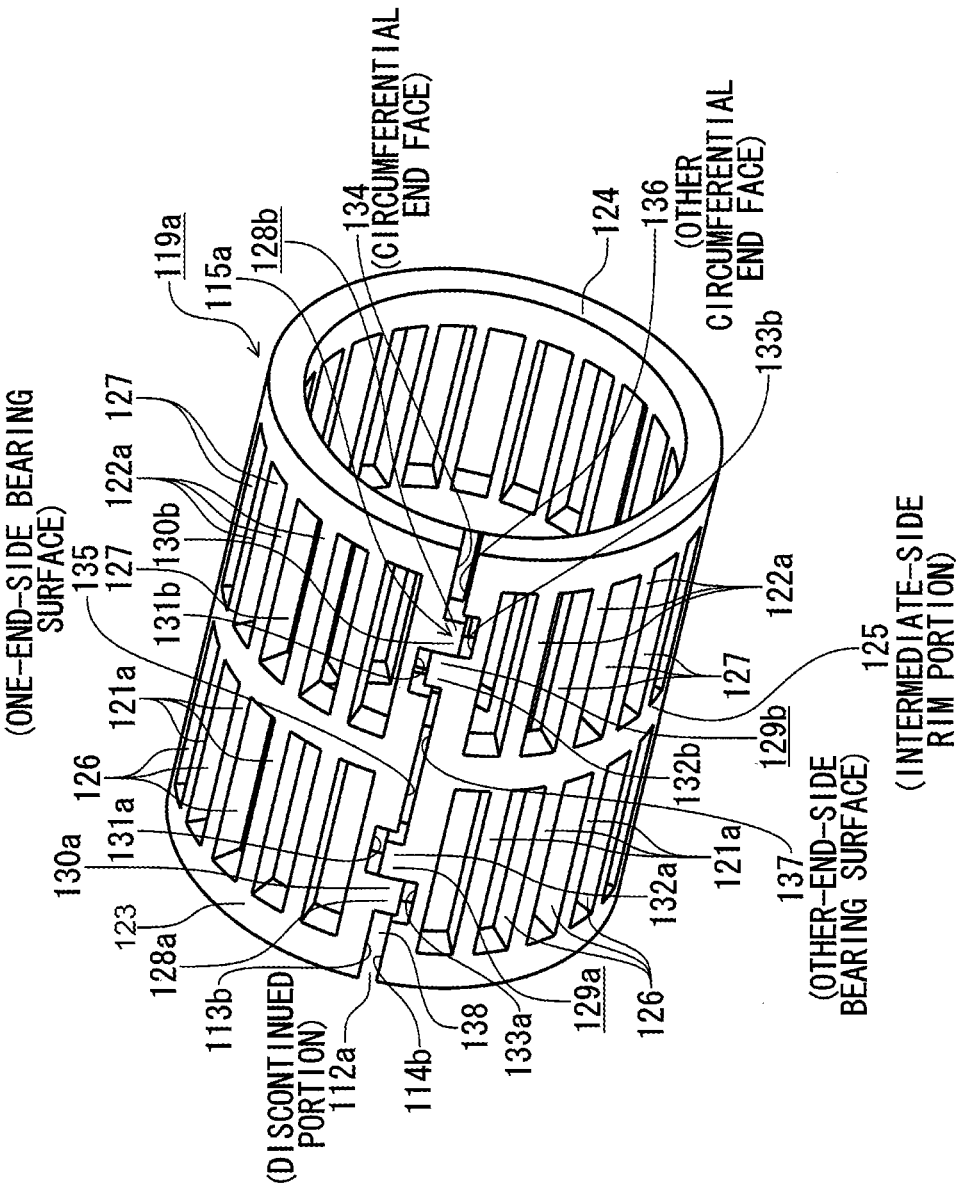
FIG. 4 is a perspective view showing a retainer according to a third embodiment of the invention.
Figure 5A:
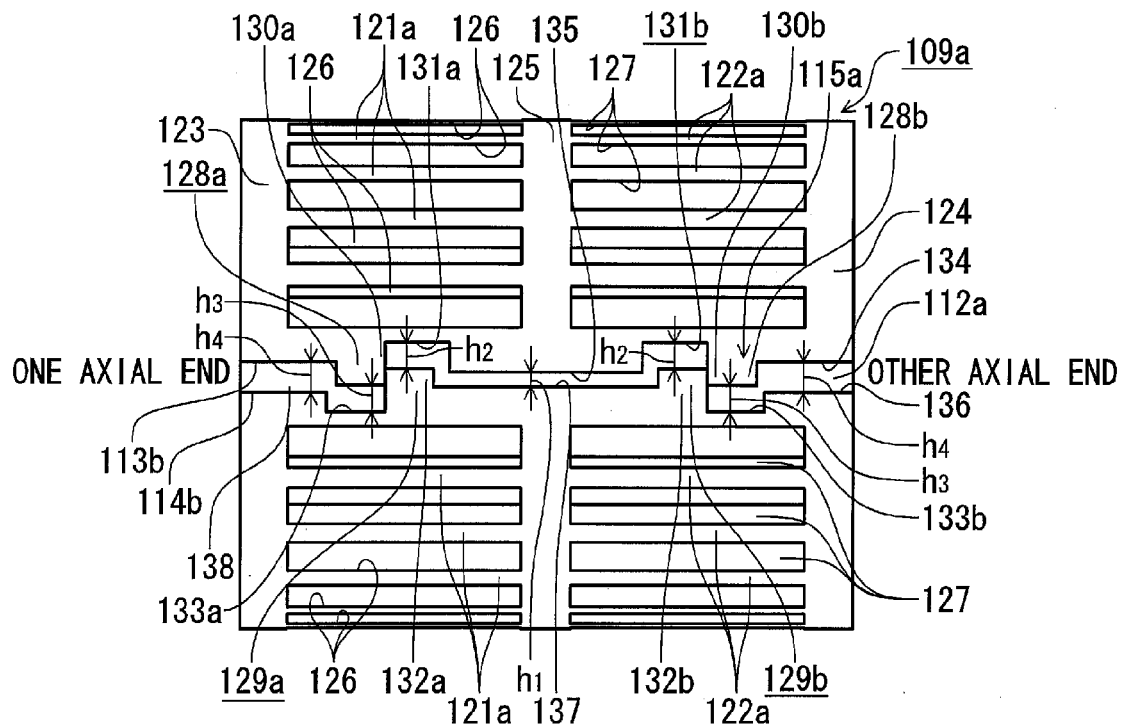
FIGS. 5A and 5B show front projections of a discontinued portion of the retainer as seen from a radially outer side that show a state in which a space in the discontinued portion of the retainer is expanded at FIG. 5A and a state in which the space is narrowed at FIG. 5B.
Figure 5B:
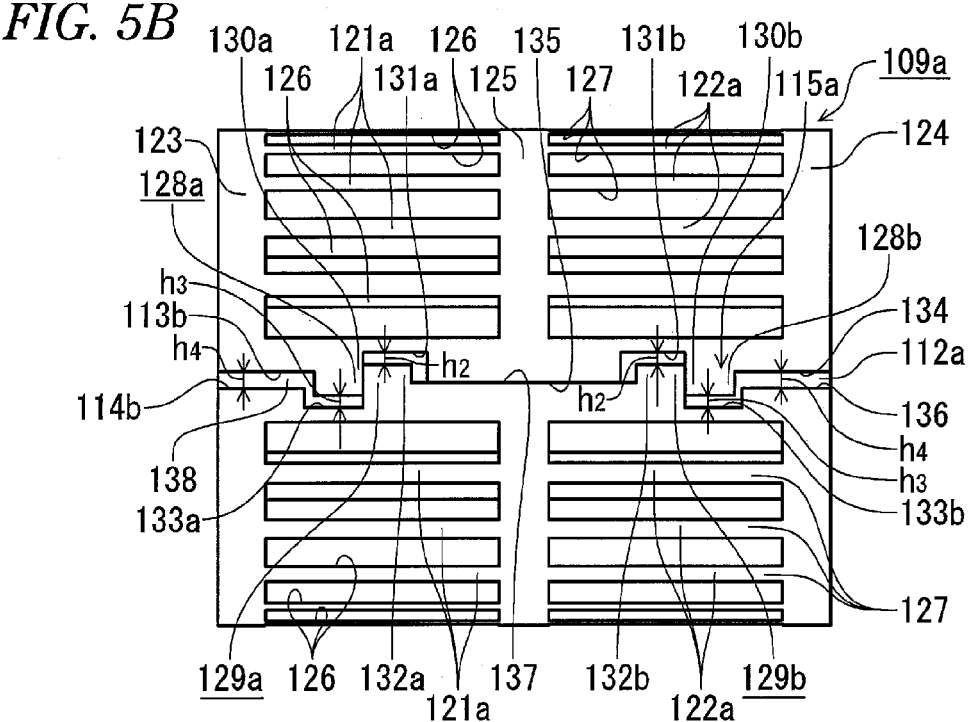
Figure 13A:
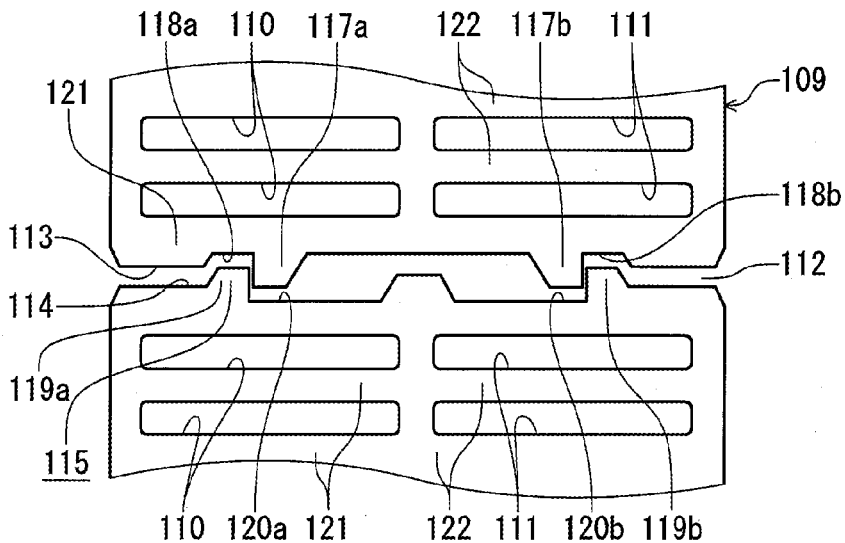
FIGS. 13A and 13B are conventional development elevations of a double-row radial roller bearing retainer that shows a state in which a space in a discontinued portion of the retainer is expanded at FIG. 13A and a state in which the space is narrowed at FIG. 13B.
Figure 13B:
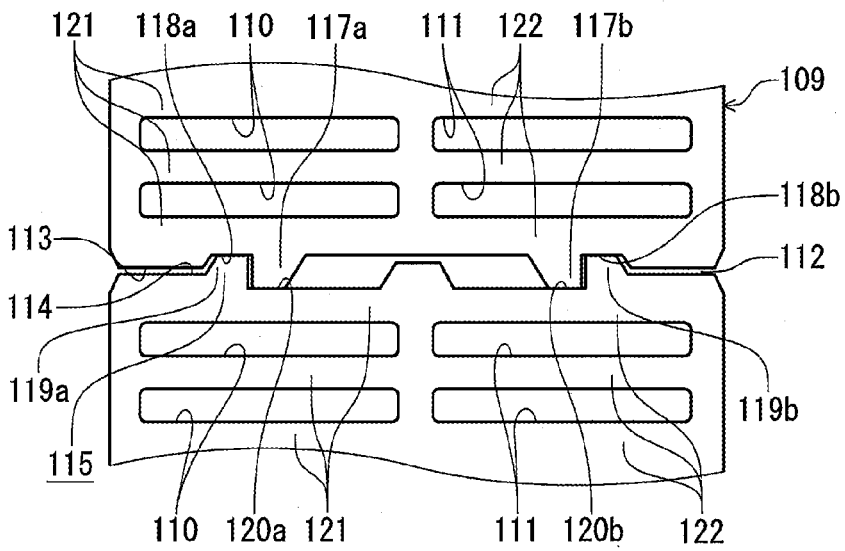

FIGS. 4, 5A and 5B show a third embodiment of the invention. Similar to the radial roller bearing 109 (refer to FIGS. 13A and 13B) of the earlier invention, a radial roller bearing retainer 109a of this embodiment is intended to retain rollers that are arranged into a plurality of rows so as to roll freely therein and has a discontinued portion 112a that is provided at, at least, one location in a circumferential direction.

The radial roller bearing retainer 109a of this embodiment described above has a one-end-side rim portion 123 and an other-end-side rim portion 124, and a center-side rim portion 125 that corresponds to an intermediate-side rim portion of claims, these rim portions each having a segmental ring shape and being provided coaxially so as to be spaced apart from each other in an axial direction. This center-side rim portion 125 is provided at an axial center position between the one-end-side rim portion 124 and the other-end-side rim portion 125.

In addition, one-side pillar portions 121a, 121a are provided intermittently along a circumferential direction in such a way as to be stretched between the one-end-side rim portion 123 and the central-side rim portion 125 that lie adjacent to each other in an axial direction. On the other hand, the other-side pillar portions 122a, 122a are provided intermittently along the circumferential direction in such a way as to be stretched between the central-side rim portion 125 and the other-end-side rim portion 124 that lie adjacent to each other in the axial direction.

Portions that are surrounded around four sides by the one-end-side rim portion 123, the central side rim portion 125 and the one-side pillar portions 121a, 121a that lie adjacent to each other in the circumferential direction are made as one-side pockets 126, 126 that are intended to retain the rollers so as to roll freely therein. In addition, portions that are surrounded around four sides by the central side rim portion 125, the other-end-side rim portion 124 and the other-side pillar portions 122a, 122a that lie adjacent to each other in the circumferential direction are made as the other-side pockets 127, 127 that are intended to retain the rollers so as to roll freely therein. In the case of this embodiment, the one-side pockets 126, 126 and the other-side pockets 127, 127 are made to coincide with each other with respect to their circumferential positions.

In the radial roller bearing retainer 109a configured as described above, a circumferential end portion 113b and the other circumferential end portion 114b that are provided so as to face each other across the discontinued portion 112a are brought into engagement with each other by an engagement portion 115a in such a way as to prevent an axial relative displacement of both the end portions 113b, 114b.

The engagement portion 115a is made up of a pair of first recess and projection portions 128a, 128b that are formed on the circumferential end portion 113b in positions that are space apart from each other in the axial direction and a pair of second recess and projection portions 129a, 129b that are formed on the other circumferential end portion 114b in positions that are spaced apart from each other in the axial direction. Of the pairs of recess and projection portions, the first recess and projection portions 128a, 128b are formed individually in a position that is aligned with an axial intermediate portion of the one-side pockets 126, 126 and a position that is aligned with an axial intermediate portion of the other-side pockets 127, 127. The second recess and projection portions 129a, 129b are formed individually in a position that is aligned with the axial intermediate portion of the one-side pockets 126, 126 and a position that is aligned with the axial intermediate portion of the other-side pockets 127, 127.

Of the pairs of recess and projection portions, the first recess and projection portions 128a, 128b are made up of first engaging projecting portions 130a, 130b and first engaging recess portions 131a, 131b, respectively.

In the first engaging projecting portions and engaging recess portions, the first engaging projecting portion 130a that makes up the first recess and projection portion 128a (the left first recess and projection portion in FIGS. 5A and 5B) is formed so as to extend in a circumferential direction (towards the other circumferential end portion 114b) in a position that is aligned with a portion that lies slightly closer to an axial end of the circumferential end portion 113b than the axial central portion of the one-side pockets 126, 126. The first engaging recess portion 131a is formed so as to recede in the circumferential direction (in an opposite direction to the other circumferential end portion 114b) at the other axial side of the first engaging projecting portion 130a (in a position that is substantially aligned with the axial central portion of the one-side pockets 126, 126).

Additionally, the first engaging projecting portion 130b that makes up the other first recess and projection portion 128b (the right recess and projection portion in FIGS. 5A and 5B) is formed so as to extend in the circumferential direction (towards the other circumferential end portion 114b) in a position that is aligned with a portion that lies slightly closer to the other axial end of the circumferential end portion 113b than the axial central portion of the other-side pockets 127, 127. The first engaging recess portion 131b is formed so as to recede in the circumferential direction (in the opposite direction to the other circumferential end portion 114b) at an axial side of the first engaging projecting portion 130b (in a position that is substantially aligned with the axial central portion of the other-side pockets 127, 127).

The second recess and projection portions 129a, 129b are made up second engaging projecting portions 132a, 132b and second engaging recess portions 133a, 133b, respectively.

In these second engaging projecting portions and second engaging recess portions, the second engaging projecting portion 132a that makes up the second recess and projection portion 129a (the left recess and projection portion in FIGS. 5A and 5B) is formed so as to extend in the circumferential direction (towards the circumferential end portion 113b) at a portion that is aligned axially with the first engaging recess portion 131a. The second engaging recess portion 133a that makes up the second recess and projection portion 129a (the left recess and projection portion in FIGS. 5A and 5B) is formed so as to recede in the circumferential direction (in an opposite direction to the circumferential end portion 113b) at a portion that is aligned axially with the first engaging projecting portion 130a.

The second recess and projection portion 132b that makes up the other second recess and projection portion 129b (the right recess and projection portion in FIGS. 5A and 5B) of the second recess and projection portions 129a, 129b is formed so as to extend in the circumferential direction (towards the circumferential end portion 113b) at a portion that is aligned axially with the other first engaging recess portion 131b. The second engaging recess portion 133b is formed so as to recede in the circumferential direction (in the opposite direction to the circumferential end portion 113b) at a portion that is aligned axially with the other first engaging projecting portion 130b.

In the case of this embodiment, the first recess and projection portions 128a, 128b are brought into recess and projection engagement with the second recess and projection portions 129a, 129b in such a state that the second engaging projecting portion 132a that makes up the second recess and projection portion 129a is disposed at the other axial side of the first engaging projecting portion 130b that makes up the first recess and projection portion 128a and that the second engaging projecting portion 132b that makes up the other second recess and projection portion 129b is disposed at the axial side of the first engaging projecting portion 130b that makes up the other first recess and projection portion 128b. With the first recess and projection portions kept in recess and projection engagement with the second recess and projection portions, the first engaging projecting portion 130a is in engagement with the second engaging projecting portion 132a in the axial direction, and the other first engaging projecting portion 130b is in engagement with the other second engaging projecting portion 132b in the axial direction, whereby an axial relative displacement of the circumferential end portion 113b and the other circumferential end portion 114b is restricted (substantially prevented).

In particular, in the case of the radial roller bearing retainer 109a of this embodiment, a portion of a circumferential end face 134 that is provided so as to face the discontinued portion 112a that is aligned axially with the center-side rim portion 125 is made as a one-end-side bearing surface 135. A portion of the other circumferential end face 136 that is aligned axially with the center-side rim portion 125 is made as an other-end-side bearing surface 137. In circumferential clearances 138 that are present between the circumferential end face 134 and the other circumferential end face 136, a clearance that is present between the one-end-side bearing surface 135 and the other-end-side bearing surface 137 is made smaller than the other clearances.

Namely, as shown in FIG. 5A, a circumferential clearance $h_1$ that is present between the one-end-side bearing surface 135 and the other-end-side bearing surface 137 is made smaller than circumferential clearances $h_2$, $h_2$ that are present between deep end faces of both the first engaging recess portions 131a, 131b and distal end faces of both the second engaging projecting portions 132a, 132b, circumferential clearances $h_3$, $h_3$ that are present between distal end faces of both the first engaging projecting portions 130a, 130b and deep end faces of both the second engaging recess portions 133a, 133b and circumferential clearances $h_4$, $h_4$ that are present between a circumferential end face and the other circumferential end face of the one-end-side rim portion 123 and the other-end-side circumferential rim portion 124 ($h_1 < h_2$, $h_1 < h_3$, $h_1 < h_4$).

In the radial roller bearing retainer 109a of this embodiment that has the configuration described above, as shown in FIG. 5B, with the circumferential end face 134 and the other circumferential end face 136 approaching nearest each other in the circumferential direction, only the circumferential clearance $h_1$ that is present between the one-end-side bearing surface 135 and the other-end-side bearing surface 137 becomes 0 ($h_1 = 0$, the clearance is lost), and the other clearances $h_2$, $h_3$, $h_4$ remain larger than 0 ($h_2 > 0$, $h_3 > 0$, $h_4 > 0$, the clearances remain).

According to the radial roller bearing retainer 190a of this embodiment described above, even with the one-end-side bearing surface 135 and the other-end-side bearing surface 137 brought into abutment with each other (with the clearance lost), the circumferential clearances remain at the other portions (the other portions of the circumferential end face 134 and the other circumferential end face 136 are not brought into abutment with each other). Because of this, even when the circumferential end face 134 and the other circumferential end face 136 are brought into strong abutment with each other based on the elastic deformation of the radial roller bearing retainer 109a during operation, a load based on this abutment can be borne by the portion where the center-side rim portion 125 is provided and which has high circumferential rigidity. As a result of this, the generation of excessive stress in part of the radial roller bearing retainer 109a is prevented, thereby making it possible to realize an improvement in the durability of the radial roller bearing retainer 109a.

In particular, in the case of the radial roller bearing retainer 109a of this embodiment, the portions of the circumferential end face 134 that are aligned axially with the axial central portions of the one-side pillar portions 121a and the other-side pillar portions 122a are made to recede further in the circumferential direction than the one-end-side bearing surface 135. Further, the portions of the other circumferential end face 136 that are aligned axially with the axial central portions of the one-side pillar portions 121a and the other-side pillar portions 122a are made to recede further in the circumferential direction than the other-end-side bearing surface 137. Consequently, even though the circumferential end face 134 and the other circumferential end face 136 approach nearest each other in the circumferential direction, bringing the one-end-side bearing surface 135 into abutment with the other-end-side bearing surface 137, there remain the circumferential clearances between the portions of the circumferential end face 134 that are aligned axially with the axial central portions of the one-side pillar portions 121a and the other-side pillar portions 122a and the portions of the other circumferential end face 136 that are aligned axially with the axial central portions of the one-side pillar portions 121a and the other-side pillar portions 122a (the portions do not abut on each other). This prevents in a more ensured fashion the application of a load based on the abutment to the portions where the circumferential rigidity is low like the one-side pillar portions 121a and the other-side pillar portions 122a, thereby making it possible to improve the durability of the radial roller bearing retainer 109a in a more ensured fashion.

Fourth Embodiment

Figure 6A:
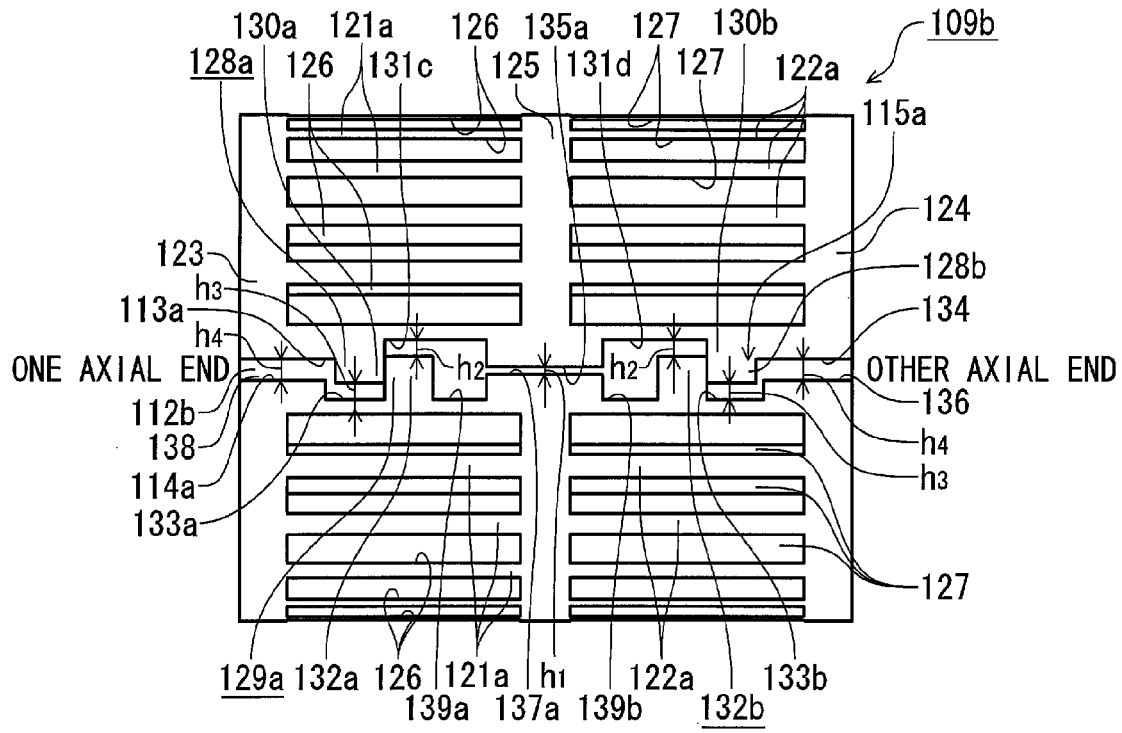
FIGS. 6A and 6B show front projections of a discontinued portion of a retainer according to a fourth embodiment of the invention as seen from a radially outer side that show a state in which a space in the discontinued portion of the retainer is expanded at FIG. 6A and a state in which the space is narrowed at FIG. 6B.
Figure 6B:
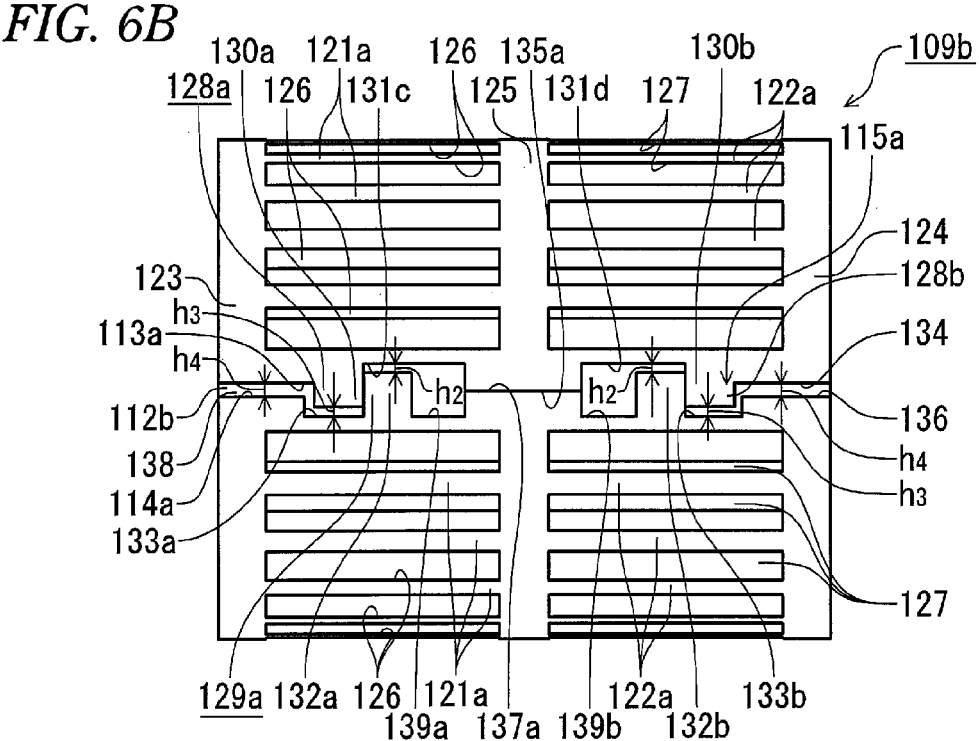

FIGS. 6A and 6B show a fourth embodiment of the invention. A radial roller bearing retainer 109b of this embodiment has a similar construction to that of the radial roller bearing retainer 109a of the third embodiment described above and is intended to retain rollers that are arranged in a plurality of rows so as to roll freely therein.

In the case of the radial roller bearing retainer 109b of this embodiment, an axial dimension of first engaging recess portions 131c, 131d that are provided in a circumferential end portion 113a that is provided to face a discontinued portion 112b is larger than that in the construction of the third embodiment described above. Specifically, the first engaging recess portion 131c on an axial side (a left side in FIGS. 6A and 6B) extends closer to an axial center of the circumferential end portion 113a than in the construction of the third embodiment described above. On the other hand, the first engaging recess portion 131d on the other axial side (a right side in FIGS. 6A and 6B) extends closer to the axial center of the circumferential end portion 113a than in the construction of the third embodiment described above. Then, an axial dimension of one-end-side bearing surface 135a is smaller than in the construction of the third embodiment described above.

Second engaging projecting portions 132a, 132b are provided on the other circumferential end portion 114a that is provided to face the discontinued portion 112b. An other-end-side recess portion 139a is formed at the other axial side of the second engaging projecting portion 132a of the second engaging projecting portions 132a, 132b that lies on the axial side so as to recede in a circumferential direction (in an opposite direction to the circumferential end portion 113a). Additionally, an other-end-side recess portion 139b is formed at an axial side of the second engaging projecting portion 132b that lies on the other axial side so as to recede in the circumferential direction (in the opposite direction to the circumferential end portion 113a). Additionally, an axial dimension of the other-end-side bearing surface 137a is smaller than in the construction of the third embodiment described above.

In this way, in the case of the radial roller bearing retainer 109b of this embodiment, the axial dimensions of the one-end-side bearing surface 135a and the other-end-side bearing surface 137a are smaller than in the construction of the third embodiment described above. Consequently, it is possible to prevent in a more ensured fashion the generation of excessive stress in part of the radial roller bearing retainer 109b, in particular, in the pillar portions 121a, 122a at both the circumferential ends of the case 109b. Additionally, the amount of a material used to form the radial roller bearing retainer 109b can be smaller than in the construction of the third embodiment. As a result of this, it is possible to realize a reduction in material cost and weight of the radial roller bearing retainer 109b. The other configurations and working effects of this embodiment are almost similar to those of the third embodiment described above.

Fifth Embodiment

Figure 7A:
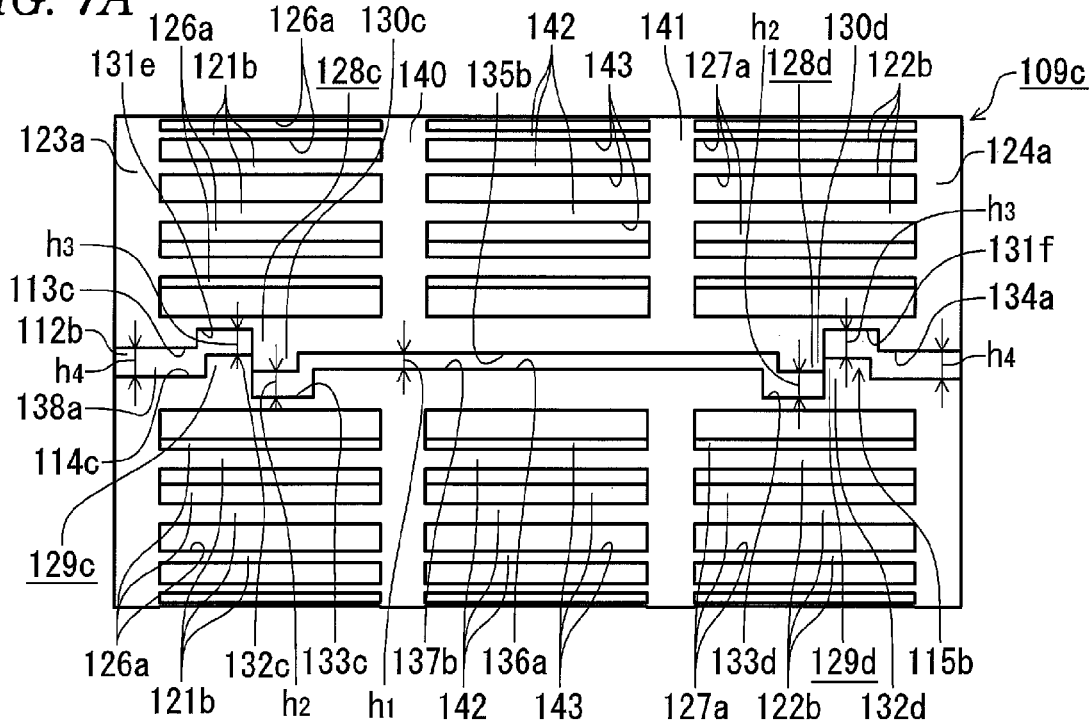
FIGS. 7A and 7B show front projections of a discontinued portion of a retainer according to a fifth embodiment of the invention as seen from a radially outer side that show a state in which a space in the discontinued portion is expanded at FIG. 7A and a state in which the space is narrowed at FIG. 7B.
Figure 7B:
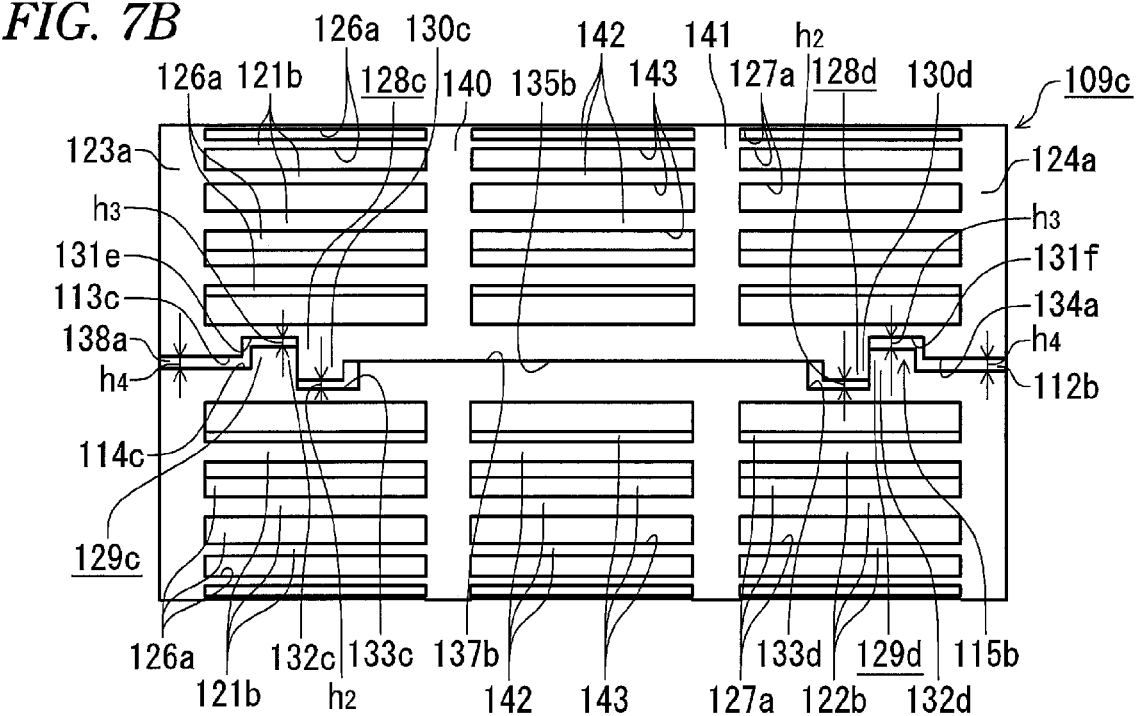

FIGS. 7A and 7B show a fifth embodiment of the invention. A radial roller bearing retainer 109c of this embodiment is intended to retain rollers that are arranged in three rows so as to roll freely therein. This radial roller bearing retainer 109c includes one-end-side rim portion 123a, an other-end-side rim portion 124a, and one-end-side intermediate rim portion 140 and an other-end-side intermediate rim portion 141 that are provided in axial positions lying between the one-end-side rim portion 123a and the other end-side rim portion 124a and that each correspond to an intermediate-side rim portion in claims, these rim portions being disposed coaxially with and in such a way as to be spaced apart from one another in an axial direction.

A plurality of one-side pillar portions 121b, 121b are provided intermittently along a circumferential direction so as to be stretched between the one-end-side rim portion 123a and the one-end-side intermediate rim portion 140. Portions that are surrounded around four sides by the one-side pillar portions 121b, 121b that lie adjacent in the circumferential direction, the one-end-side intermediate rim portion 123a and the one-end-side intermediate rim portion 140 are made as one-side pockets 126a, 126a that retain the rollers so as to roll freely therein.

A plurality of intermediate-side pillar portions 142, 142 are provided intermittently along the circumferential direction so as to be stretched between the one-end-side intermediate rim portion 140 and the other-end-side intermediate rim portion 141. Portions that are surrounded around four sides by the intermediate-side pillar portions 142, 142 that lie adjacent in the circumferential direction, the one-end-side intermediate rim portion 140 and the other-end-side intermediate rim portion 141 are made as intermediate-side pockets 143, 143 that retain the rollers so as to roll freely therein.

A plurality of other-end-side pillar portions 122b, 122b are provided intermittently along the circumferential direction so as to be stretched between the other-end-side intermediate rim portion 141 and the other-end-side rim portion 124a. Portions that are surrounded around four sides by the other-end-side pillar portions 122b, 122b that lie adjacent in the circumferential direction, the other-end-side intermediate rim portion 140 and the other-end-side rim portion 124a are made as the other-side pockets 127a, 127a that retain the rollers so as to roll freely therein. Additionally, in the case of this embodiment, the one-side pockets 126a, the intermediate-side pockets 143 and the other-side pockets 127a are aligned with one another with respect to their circumferential position.

Similar to the third and fourth embodiments that have been described above, the radial roller bearing retainer 109c of this embodiment has a discontinued portion 112b at one location in the circumferential direction. In addition, a circumferential end portion 113c and the other circumferential end portion 114c that are provided so as to face each other across the discontinued portion 112b are brought into engagement with each other by an engagement portion 115b in such a state that an axial relative displacement of both the end portions 113c, 114c is prevented.

The engagement portion 115b is made up of a pair of first recess and projection portions 128c, 128d that are formed on the circumferential end portion 113c in positions that are spaced apart from each other in an axial direction (in a position that is aligned with an axial intermediate portion of the one-side pockets 126a, 126a and in a position that is aligned with an axial intermediate portion of the other-side pockets 127a, 127a) and second recess and projection portions 129c, 129d that are formed on the other circumferential end portion 114c in positions that are spaced apart from each other in the axial direction (in a position that is aligned with the axial intermediate portion of the one-side pockets 126a, 126a and in a position that is aligned with the axial intermediate portion of the other-side pockets 127a, 127a).

Of the pairs of recess and projection portions, the first recess and projection portions 128c, 128d are made up of first engaging projecting portions 130c, 130d and first engaging recess portions 131e, 131f, respectively.

The first engaging projecting portion 130c that makes up the first recess and projection portion 128c (a left recess and projection portion in FIGS. 7A and 7B) of the first recess and projection portions 128c, 128d is formed so as to extend in the circumferential direction (towards the other circumferential end portion 114c) in the position that is substantially aligned with the axial central portion of the one-side pockets 126a, 126a. The first engaging recess portion 131e is formed so as to recede in the circumferential direction (in an opposite direction to the other circumferential end portion 114c) at an axial side of the first engaging projecting portion 130c (at a portion lying slightly closer to the axial side than the axial central portion of the one-side pockets 126a, 126a).

In addition, the first engaging projecting portion 130d that makes up the other first recess and projection portion 128d (a right recess and projection portion in FIGS. 7A and 7B) of the first recess and projection portions 128c, 128d is formed so as to extend in the circumferential direction (towards the other circumferential end portion 114c) in the position that is substantially aligned with the axial central portion of the other-side pockets 127a, 127a. The first engaging recess portion 131f is formed so as to recede in the circumferential direction (in the opposite direction to the other circumferential end portion 114c) at the other axial side of the first engaging projecting portion 130d (at a portion lying slightly closer to the other axial side than the axial central portion of the other-side pockets 127a, 127a).

The second recess and projection portions 129c, 129d are made up of second engaging projecting portions 132c, 132d and second engaging recess portions 133c, 133d, respectively.

The second engaging projecting portion 132c that makes up the second recess and projection portion 129c (a left recess and projection portion in FIGS. 7A and 7B) of the second recess and projection portions 129c, 129d is formed so as to extend in the circumferential direction (towards the circumferential end portion 113c) at a portion that is aligned axially with the first engaging recess portion 131e. The second engaging recess portion 133c is formed so as to recede in the circumferential direction (in an opposite direction to the circumferential end portion 113c) at a portion that is aligned axially with the first engaging projecting portion 130c.

The second engaging projecting portion 132d that makes up the other second recess and projection portion 129d (a right recess and projection portion in FIGS. 7A and 7B) of the second recess and projection portions 129c, 129d is formed so as to extend in the circumferential direction (towards the circumferential end portion 113c) at a portion that is aligned axially with the other first engaging recess portion 131f. The second engaging recess portion 131f is formed so as to recede in the circumferential direction (in the opposite direction to the circumferential end portion 113c) at a portion that is aligned axially with the other first engaging projecting portion 130d.

In the case of this embodiment, the first recess and projection portions 128c, 128d are brought into recess and projection engagement with the second recess and projection portions 129c, 129d, respectively, in such a state that the second engaging projecting portion 132c that makes up the second recess and projection portion 129c is disposed at an axial side of the first engaging projecting portion 130c that makes up the first recess and projection portion 128c and that the second engaging projecting portion 132d that makes up the other second recess and projection portion 129d is disposed at the other axial side of the first engaging projecting portion 130d that makes up the other first recess and projection portion 128d.

With the first recess and projection portions 128c, 128d kept in recess and projection engagement with the second recess and projection portions 129c, 129d, respectively, the first engaging projecting portion 130c is in axial engagement with the second engaging projecting portion 132c, and the other first engaging projecting portion 130d is in axial engagement with the other second engaging projecting portion 132d, whereby an axial relative displacement of the circumferential end portion 113c and the other circumferential end portion 114c is restricted.

In addition, in the case of this embodiment, in a circumferential end face 134a that is provided so as to face the discontinued portion 112b, a portion that is aligned axially with an axial central portion of the one-end-side intermediate rim portion 140 and a portion that is aligned axially with an axial central portion of the other-end-side intermediate rim portion 141 are made as one-end-side bearing surfaces 135b. Further, in the case of this embodiment, in the circumferential end face 134a, a portion that is aligned axially with the one-end-side intermediate rim portion 140, a portion that is aligned axially with the other-end-side intermediate rim portion 141 and a portion that lies adjacent to those two portions are present on the same plane. Namely, in the case of this embodiment, in the circumferential end face 134a, a portion extending from the other axial side of the first engaging projecting portion 130c that makes up the first recess and projection portion 128c to an axial side of the first engaging projecting portion 130d that makes up the other first recess and projection portion 128d is made as the one-end-side bearing surface 135b.

Additionally, in the case of this embodiment, in the other circumferential end face 136a of the radial roller bearing retainer 109c, a portion that is aligned axially with the one-end-side intermediate rim portion 140 and a portion that is aligned axially with the other-end-side intermediate rim portion 141 are made as the other-end-side bearing surfaces 137b. Further, in the case of this embodiment, in the other circumferential end face 136a, the portion that is aligned axially with the one-end-side intermediate rim portion 140, the portion that is aligned axially with the other-end-side intermediate rim portion 141 and a portion that lies adjacent to those two portions are present on the same plane. Namely, in the case of this embodiment, in the other circumferential end face 136a, a portion extending from the other axial side of the second engaging recess portion 133c that makes up the second recess and projection portion 129c to an axial side of the second engaging recess portion 133d that makes up the other second recess and projection portion 129d is made as an other-end-side bearing surface 137b.

In addition, in the case of this embodiment, in circumferential clearances 138a which are present between the circumferential end face 134a and the other circumferential end face 136a, a circumferential clearance that is present between the one-end-side bearing surface 135b and the other-end-side bearing surface 137b is smaller than clearances at the other portions.

Namely, as shown in FIG. 7A, a circumferential clearance $h_1$ that is present between the one-end-side bearing surface 135b and the other-end-side bearing surface 137b is smaller than circumferential clearances $h_2$, $h_2$ that are present between distal end faces of the first engaging projecting portions 130c, 130d and deep end faces of the second engaging recess portions 133c, 133d, circumferential clearances $h_3$, $h_3$ that are present between deep end faces of the first engaging recess portions 131e, 131f and distal end faces of the second engaging projecting portions 132c, 132d, and circumferential clearances $h_4$, $h_4$ that are present between a circumferential end face and the other circumferential end face of the one-end-side rim portion 123a and the other-end-side circumferential rim portion 124a ($h_1<h_2$, $h_1<h_3$, $h_1<h_4$).

In the radial roller bearing retainer 109a of this embodiment that has the configuration described above, as shown in FIG. 7B, with the circumferential end face 134a and the other circumferential end face 136a approaching nearest each other in the circumferential direction, the circumferential clearance $h_1$ that is present between the one-end-side bearing surface 135b and the other-end-side bearing surface 137b becomes 0 ($h_1=0$), and the circumferential clearances $h_2$, $h_2$ that are present between the distal end faces of the first engaging projecting portions 130c, 130d and the deep end faces of the second engaging recess portions 133c, 133d, the circumferential clearances $h_3$, $h_3$ that are present between the deep end faces of the first engaging recess portions 131e, 131f and the distal end faces of the second engaging projecting portions 132c, 132d, and the circumferential clearances $h_4$, $h_4$ that are present between the circumferential end face and the other circumferential end face of the one-end-side rim portion 123a and the other-end-side rim portion 124a are larger than 0 ($h_2>0$, $h_3>0$, $h_4>0$). The other configurations and working effects of this embodiment are almost similar to those of the third embodiment described previously.

Sixth Embodiment

FIGS. 8A and 8B show a sixth embodiment of the invention. Similar to the radial roller bearing retainer 109c of the fifth embodiment that has just been described above, a radial roller bearing retainer 109d of this embodiment is intended to retain rollers that are arranged in three rows so as to roll freely therein.

In particular, in the case of the radial roller bearing retainer 109d of this embodiment, one-end-side recess portion 144 is formed so as to recede in a circumferential direction (in an opposite direction to the other circumferential end face 136b)

at an axial central portion (a position that is aligned with an axial central portion of intermediate-side pockets 143, 143) of a circumferential end face 134b that faces a discontinued portion 112c at one side thereof.

On the other hand, an other-end-side recess portion 145 is formed to the discontinued portion 112c so as to recede in a circumferential direction (in an opposite direction to the circumferential one end face 134b) at an axial central portion (a position that is aligned with the axial central portion of the intermediate-side pockets 143, 143) of the other circumferential end face 136b that faces at the other side thereof.

Namely, in the case of the radial roller bearing retainer 109d, in the circumferential end face 134b, a portion that is aligned axially with an axial central portion of one-end-side intermediate rim portion 140 is made as a first end-side bearing surface 146. In addition, in the circumferential end face 134b, a portion that is aligned axially with an axial central portion of the other-end-side intermediate rim portion 141 is made as a second end-side bearing surface 147.

On the other hand, in the other circumferential end face 136b, a portion that is aligned axially with an axial central portion of the one-end-side intermediate rim portion 140 is made as a first other-end-side bearing surface 148. Additionally, in the other circumferential end face 136b, a portion that is aligned axially with an axial central portion of the other-end-side intermediate rim portion 141 is made as a second other-end-side bearing surface 149.

In circumferential clearances 138b that are present between the circumferential end face 134b and the other circumferential end face 136b, circumferential clearances that are present between the first and second end-side bearing surfaces 146, 147 and the first and second other-end-side bearing surfaces 148, 149 are smaller than clearances at the other portions.

Namely, as shown in FIG. 8A, circumferential clearances $h_1$, $h_1$ that are present between the first and second end-side bearing surfaces 146, 147 and the first and second other-end-side bearing surfaces 148, 149 are smaller than circumferential clearances $h_2$, $h_2$ that are present between distal end faces of first engaging projecting portions 130c, 130d and deep end faces of second engaging recess portions 133c, 133d, circumferential clearances $h_3$, $h_3$ that are present between deep end faces of first engaging recess portions 131e, 131f and distal end faces of second engaging projecting portions 132c, 132d, circumferential clearances $h_4$, $h_4$ that are present between a circumferential end face and the other circumferential end face of a one-end-side rim portion 123a and an other-end-side rim portion 124a, and a circumferential clearance $h_5$ that is present between a deep end face of the one-end-side recess portion 144 and a deep end face of the other-end-side recess portion 145. ($h_1 < h_2$, $h_1 < h_3$, $h_1 < h_4$, $h_1 < h_5$).

In the radial roller bearing retainer 109d of this embodiment having the configuration described above, with the circumferential end face 134b and the other circumferential end face 136b approaching nearest each other in the circumferential direction, the circumferential clearances $h_1$ present between the first and second one-end-side bearing surfaces 146, 147 and the first and second other-end-side bearing surfaces 148, 149 become 0 ($h_1 = 0$). On the other hand, the circumferential clearances $h_2$, $h_2$ that are present between the distal end faces of the first engaging projecting portions 130c, 130d and the deep end faces of the second engaging recess portions 133c, 133d, the circumferential clearances $h_3$, $h_3$ that are present between the deep end faces of the first engaging recess portions 131e, 131f and the distal end faces of the second engaging projecting portions 132c, 132d, the circumferential clearances $h_4$, $h_4$ that are present between the circumferential end face and the other circumferential end face of the one-end-side rim portion 123a and the other-end-side rim portion 124a, and the circumferential clearance $h_5$ that is present between the deep end face of the one-end-side recess portion 144 and the deep end face of the other-end-side recess portion 145 are larger than 0 ($h_2 > 0$, $h_3 > 0$, $h_4 > 0$, $h_5 > 0$).

In the case of this embodiment, with the circumferential end face 134b and the other circumferential end face 136b approaching nearest each other in the circumferential direction, the circumferential clearance is provided at the portions of both the end faces 134b, 136b that are aligned with the axial central portion of the intermediate-side pockets 143, 143. Because of this, even though the circumferential space (clearance) becomes so small that both the end faces 134b, 136b are brought into strong abutment with each other based on the elastic deformation of the radial roller bearing retainer 109d during operation, there is no such situation that a load resulting from the abutment is borne by the portions of the end faces 134b, 136b that are aligned with the axial central portion of the intermediate-side pockets 143, 143 and where the circumferential rigidity is low. As a result of this, it is possible to realize an improvement in the durability of the radial roller bearing retainer 109d in a more ensured fashion.

In addition, in the case of this embodiment, providing the one-end-side recess portion 144 and the other-end-side recess portion 145 can reduce the amount of a material used to form the radial roller bearing retainer 109d accordingly. This can realize a reduction in material cost and weight of the radial roller bearing retainer 109d. The other configurations and working effects of this embodiment are almost similar to those of the fifth embodiment.

Further, this patent application is based on Japanese Patent Application No. 2012-158437 filed on Jul. 17, 2012 and Japanese Patent Application No. 2012-158802 filed on Jul. 17, 2012, the contents of which are incorporated herein by reference.

INDUSTRIAL APPLICABILITY

In the first and second embodiments described above, the construction of the retainer is described as having the discontinued portion at one location in the circumferential direction. However, the invention can also be applied to a retainer having a construction in which a discontinued portion is provided at a plurality of locations in a circumferential direction (a so-called split retainer in which circumferential end edges of a plurality of partially cylindrical retainers are engaged).

In addition, the invention can also be applied to a radial roller bearing retainer having a multi-row construction in which rollers are arranged in three or more rows, in addition to the single-row and double-row constructions as described in the embodiments.

Additionally, in the second embodiment described above, in the double-row radial roller bearing retainer, the circumferential load is borne by the circumferential end faces in the positions that are aligned axially with the one-end-side rim portion, the intermediate-side rim portion, and the other-end-side rim portion (the circumferential end faces are in abutment with each other at those positions). However, the circumferential load can also be borne by the circumferential end faces only in the positions that are aligned axially with the one-end-side rim portion and the other-end-side rim portion (the circumferential end faces are in abutment with each other only in those positions).

In the third to sixth embodiments described above, the retainer is described as having the construction in which the discontinued portion is provided at one location in the circumferential direction. However, the invention can also be applied to a retainer having a construction in which a discontinued portion is provided at a plurality of locations in a circumferential direction (a so-called split retainer in which circumferential end edges of a plurality of partially cylindrical retainers are engaged).

Additionally, the invention can also be applied to a radial roller bearing retainer having a multi-row construction in which rollers are arranged in four rows, in addition to the double-row and triple-row constructions as described in the embodiments.

DESCRIPTION OF REFERENCE NUMERALS AND SIGNS 1 radial roller bearing; 2 radially outer member; 3 outer ring raceway; 4 shaft; 5 inner ring raceway; 6 roller; 7, 7a, 7b, 7c retainer; 8, 8a, 8b, 8c one-end-side rim portion; 9, 9a, 9b, 9c other-end-side rim portion; 10, 10a, 10b pillar portion; 11, 11a, 11b pocket; 12, 12a, 12b discontinued portion; 13, 13a, 13b circumferential end portion; 14, 14a, 14b the other circumferential end portion; 15, 15a, 15b engagement portion; 16, 16a, 16b, 16c first recess and projection portion; 17, 17a, 17b, 17c second recess and projection portion; 18, 18a, 18b, 18c, 18d first engaging projecting portion; 19, 19a, 19c, 19d first engaging recess portion; 20, 20a, 20b, 20c, 20d second engaging projecting portion; 21, 21a, 21b, 21c, 21d second engaging recess portion; 22, 22a, 22b circumferential end face; 23a, 23b one-end-side bearing surface; 24, 24a, 24b, the other circumferential end face; 25a, 25b other-end-side bearing surface; 26, 26a clearance; 27 center-side rim portion (intermediate-side rim portion); 28 pillar portion; 29 pocket; 101a, 101b gearwheel; 102 power transfer shaft; 103a, 103b radial roller bearing; 104a, 104b synchromesh mechanism; 105a, 105b needle; 106a, 106b outer ring raceway; 107a, 107b inner ring raceway; 108a, 108b, 108c, 108d retainer; 109, 109a, 109b, 109c, 109d retainer; 110 one-side pocket; 111 the other-side pocket; 112, 112a, 112b, 112c discontinued portion; 113, 113a, 113b, 113c circumferential end portion; 114, 114a, 114b, 114c the other circumferential end portion; 115, 115a, 115b engagement portion; 116 cylindrical member; 117a, 117b first engaging projecting portion; 118a, 118b first engaging recess portion; 119a, 119b second engaging projecting portion; 120a, 120b second engaging recess portion; 121, 121a, 121b one-side pillar portion; 122, 122a, 122b the other-side pillar portion; 123, 123a one-end-side rim portion; 124, 124a other-end-side rim portion; 125 central-side rim portion (intermediate-side rim portion); 126, 126a one-side pocket; 127, 127a the other-side pocket; 128a, 128b, 128c, 128d first recess and projection portion; 129a, 129b, 129c, 129d second recess and projection portion; 130a, 130b, 130c, 130d first engaging projecting portion; 131a, 131b, 131c 131d, 131e, 131f first engaging recess portion; 132a, 132b, 132c, 132d second engaging projecting portion; 133a, 133b, 133c, 133d second engaging recess portion; 134, 134a, 134b, circumferential end face; 135, 135a, 135b one-end-side bearing surface; 136, 136a, 136b the other circumferential end face; 137, 137a, 137b other-end-side bearing surface; 138, 138a, 138b clearance; 139a, 139b other-end-side recess portion; 140 one-end-side intermediate rim portion (intermediate-side rim portion); 141 other-end-side intermediate rim portion (intermediate-side rim portion); 142 intermediate-side pillar portion; 143 intermediate-side pocket; 144 one-end-side recess portion; 145 other-end-side recess portion; 146 first end-side bearing surface; 147 second end-side bearing surface; 148 first other-end-side bearing surface; 149 second other-end-side bearing surface.

The invention claimed is:

1. A radial roller bearing retainer comprising:
a discontinued portion at, at least, one location in a circumferential direction;
a plurality of rim portions; a plurality of pillar portions; and a plurality of pockets,
the rim portions each having a segmental ring shape and being provided coaxially so as to be spaced apart from each other in an axial direction,
the pillar portions being provided intermittently along the circumferential direction so as to be stretched between the rim portions that lie adjacent in the axial direction,
the pockets being provided in portions that are surrounded along four sides by the rim portions that lie adjacent in the axial direction and the pillar portions that lie adjacent in the circumferential direction,
a circumferential width of the discontinued portion being able to be changed through elastic deformation, wherein:
in a circumferential end portion that is provided so as to face the discontinued portion, a portion that is aligned axially with one of the rim portions that is provided at an axial end and a portion that is aligned axially with another of the rim portions that is provided at an other axial end are made as a pair of one-end-side bearing surfaces;
in an other circumferential end portion, a portion that is aligned axially with the rim portion that is provided at the axial end and a portion that is aligned axially with the rim portion that is provided at the other axial end are made as a pair of other-end-side bearing surfaces;
an engagement portion is provided individually at an axial space portion between the pair of one-end-side bearing surfaces and an axial space portion between the pair of other-end-side bearing surfaces;
the engagement portion on the circumferential end portion includes a pair of first engaging projecting portions that project more than the pair of one-end-side bearing surfaces and that are space apart in the axial direction and at least one first engaging recess portion that is provided in an axial space portion between the pair of first engaging projecting portions so as to recede more than the pair of first engaging projecting portions;
the engagement portion on the other circumferential end portion includes a pair of second engaging recess portions that recede more than the pair of other-end-side bearing surfaces and that are spaced apart in the axial direction and at least one second engaging projecting portion that is provided at an axial space portion between the pair of second engaging recess portions so as to project more than the pair of second engaging recess portions;
the pair of first engaging projecting portions and the second engaging projecting portion are axially brought into engagement with each other to restrict an axial relative displacement; and
circumferential clearances that are present between the one-end-side bearing surfaces and the other-end-side bearing surfaces are smaller than circumferential clearances that are present between the first engaging projecting portions and the second engaging recess portions and a circumferential clearance that is present between the second engaging projecting portion and the first engaging recess portion so that the first engaging projecting portions are not brought into abutment in the circumferential direction with the second engaging recess portions and the second engaging projecting portion is not brought into abutment with the first engaging recess portion even though the circumferential width of the discontinued portion becomes circumferentially smaller.

2. A radial roller bearing retainer comprising:
a discontinued portion at, at least, one location in a circumferential direction;
three or more rim portions; a plurality of pillar portions; and a plurality of pockets,
the rim portions including a one-end-side rim portion, an other-end-side rim portion, and at least one intermediate-side rim portion that is disposed at a portion lying between the one-end-side rim portion and the other-end-side rim portion in an axial direction, the rim portions each having a segmental ring shape and being provided coaxially so as to be spaced apart from one another in the axial direction,
the pillar portions being provided intermittently along the circumferential direction so as to be stretched between the rim portions that lie adjacent in the axial direction,
the pockets being provided in portions that are surrounded along four sides by the rim portions that lie adjacent in the axial direction and the pillar portions that lie adjacent in the circumferential direction,
a circumferential width of the discontinued portion being able to be changed through elastic deformation, wherein:
in a circumferential end portion that is provided so as to face the discontinued portion, a portion that is aligned axially with the at least one intermediate-side rim portion is made as a one-end-side bearing surface;
in an other circumferential end portion, a portion that is aligned axially with the at least one intermediate-side rim portion is made an other-end-side bearing surface;
an engagement portion is provided individually on the circumferential end portion and the other circumferential end portion;

the engagement portion on the circumferential end portion includes at least two first engaging projecting portions that project more than the pair of one-end-side bearing surfaces and that are space apart in the axial direction and at least two first engaging recess portions that recede more than the at least two first engaging projecting portions and that are spaced apart in the axial direction;
the engagement portion on the other circumferential end portion includes at least two second engaging recess portions that recede more than the pair of other-end-side bearing surfaces and that are spaced apart in the axial direction and at least two second engaging projecting portions that project more than the at least two second engaging recess portions and that are spaced apart in the axial direction;
the first engaging projecting portions and the second engaging projecting portions are axially brought into engagement with each other to restrict an axial relative displacement; and
a circumferential clearance that is present between the one-end-side bearing surface and the other-end-side bearing surface is smaller than circumferential clearances that are present between the first engaging projecting portions and the second engaging recess portions and circumferential clearances that are present between the second engaging projecting portions and the first engaging recess portions so that the first engaging projecting portions are not brought into abutment with the second engaging recess portions and the second engaging projecting portions are not brought into abutment with the first engaging recess portions even though the circumferential width of the discontinued portion becomes circumferentially smaller.

\* \* \* \* \*